(12) United States Patent
Arita et al.

(10) Patent No.: US 8,132,534 B2
(45) Date of Patent: Mar. 13, 2012

(54) OVERFLOW DEVICE FOR WATER TANK

(75) Inventors: Ryuzo Arita, Sakura (JP); Kazutoshi Tominaga, Higashiosaka (JP)

(73) Assignee: Kabushiki Kaisha Tominaga Jyushi Kogyosho, Higashiosaka-shi, Osaka (JP)

( * ) Notice: Subject to any disclaimer, the term of this patent is extended or adjusted under 35 U.S.C. 154(b) by 234 days.

(21) Appl. No.: 12/310,419

(22) PCT Filed: Jul. 18, 2007

(86) PCT No.: PCT/JP2007/064151
§ 371 (c)(1),
(2), (4) Date: Jul. 20, 2009

(87) PCT Pub. No.: WO2008/023512
PCT Pub. Date: Feb. 28, 2008

(65) Prior Publication Data
US 2009/0293812 A1    Dec. 3, 2009

(30) Foreign Application Priority Data

Aug. 25, 2006  (JP) ................................ 2006-228892

(51) Int. Cl.
*A01K 63/04* (2006.01)
(52) U.S. Cl. .................. 119/259; 137/143; 137/147
(58) Field of Classification Search .......... 119/259–262, 119/245, 248; 137/140, 142–144, 147; 210/416.2, 210/167.21
See application file for complete search history.

(56) References Cited

U.S. PATENT DOCUMENTS

| 2,363,539 | A | * | 11/1944 | Lockridge ................. 137/131 |
| 4,036,756 | A | * | 7/1977 | Dockery ................. 210/167.27 |
| 6,056,886 | A | * | 5/2000 | Hickok et al. ................. 210/776 |
| 6,299,765 | B1 | * | 10/2001 | Fabrizio ................. 210/167.27 |
| 7,001,509 | B1 | * | 2/2006 | Lin ................. 210/167.27 |
| 7,918,995 | B2 | * | 4/2011 | Arita et al. ................. 210/167.22 |
| 2010/0236489 | A1 | * | 9/2010 | Arita et al. ................. 119/247 |

FOREIGN PATENT DOCUMENTS

| JP | 3-072829 | | 3/1991 |
| JP | 3-018619 | | 11/1995 |
| JP | 2000179465 A | * | 6/2000 |
| JP | 3-118073 | | 1/2006 |

OTHER PUBLICATIONS

International Search Report.

* cited by examiner

*Primary Examiner* — Kristen Hayes
(74) *Attorney, Agent, or Firm* — Collard & Roe, P.C.

(57) ABSTRACT

An aquarium overflow device is capable of preventing inadvertent supply of water in an aquarium from being supplied to an outside during, e.g., power failure. An aquarium overflow device is for supplying the water in an aquarium to an external device outside the aquarium. The device is equipped with a reversed U-shaped siphon pipe for supplying the water in the aquarium to an outside of the aquarium, the siphon pipe having an inlet side end portion disposed in the aquarium and an inlet side end portion disposed with the outlet side end portion disposed outside the aquarium, a suction device for sucking an inside of the siphon pipe, the suction device being connected to an upper portion of the siphon pipe, and an air introduction device for introducing air to an upper portion in the siphon pipe when suction by the suction device stops.

4 Claims, 19 Drawing Sheets

FIG. 3
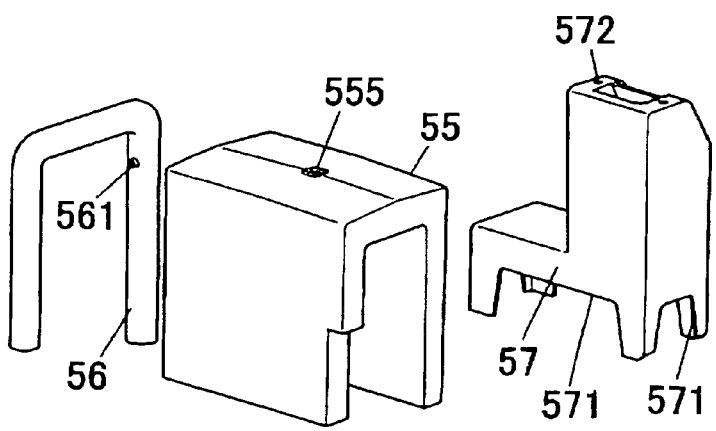
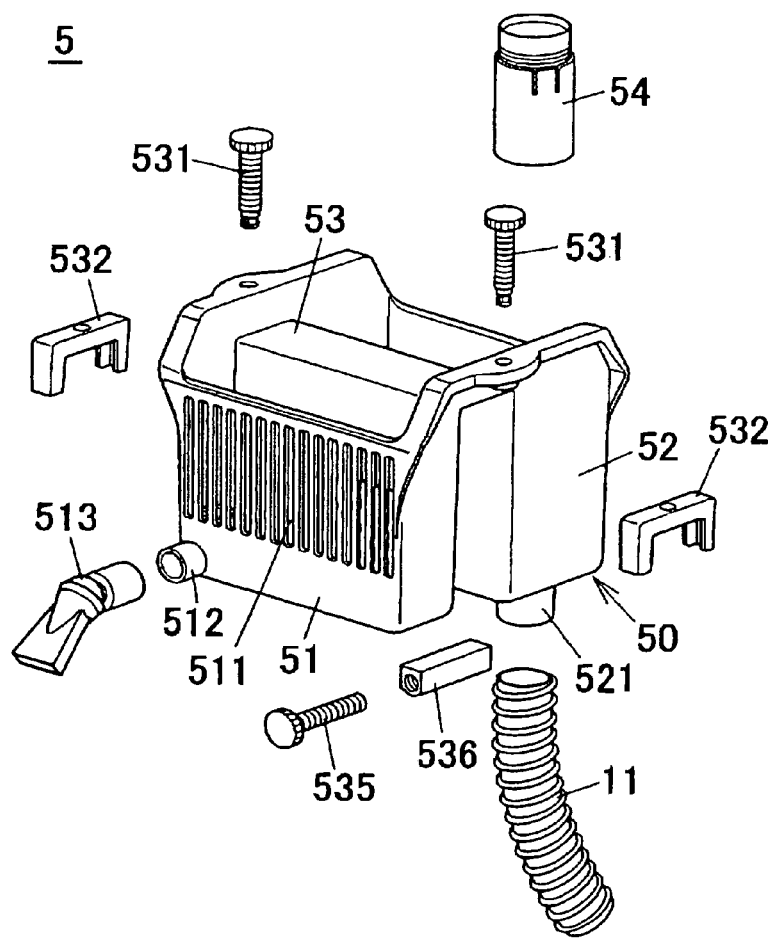

US 8,132,534 B2

OVERFLOW DEVICE FOR WATER TANK

CROSS REFERENCE TO RELATED APPLICATIONS

This application is the National Stage of PCT/JP2007/064151 filed on Jul. 18, 2007, which claims priority under 35 U.S.C. §119 of Japanese Application No. 2006-228892 filed on Aug. 25, 2006. The international application under PCT article 21(2) was not published in English.

TECHNICAL FIELD

The present invention relates to an overflow device for supplying water in an aquarium such as an aquarium for ornamental fish to an external equipment such as a filtering device.

BACKGROUND ART

When keeping ornamental fish, such as, e.g., saltwater fish or freshwater fish, in an aquarium, a filtering device is generally installed for the purpose of keeping the water in the aquarium clean.

As an aquarium filtering device, an underwater installation type filtering device designed to be installed within an aquarium and an outside installation type filtering device designed to be installed outside an aquarium are well known. As compared with the underwater installation type filtering device, the outside installation type filtering device is suitable in terms of enlarging the size and can have excellent filtration capacity.

Conventionally, for the purpose of supplying the water in the aquarium to an outside installation type filtering device or returning the water in the filtering device to the aquarium, an overflow device is used.

As disclosed in the following Patent Document 1, a conventional overflow device includes a tank-outside water storing portion to be disposed on the side wall outside surface of an aquarium, and an inverted U-shaped siphon pipe to be disposed so as to straddle the aquarium inside and the aquarium outside, and an overflow pipe provided in the tank-outside water storing portion. It is configured such that the water in the aquarium is supplied to the tank-outside water storing portion via the siphon pipe and flows out via the overflow pipe to be supplied to a filtering device disposed outside the aquarium.

The filtering device disposed outside the aquarium is provided with a discharge pump so that the water filtered by the filtering device is forcibly discharged (returned) by the discharge pump to the aquarium via an outlet pipe.

Patent Document 1: Japanese Utility Model Registration No. 3018619 (FIG. 3)

DISCLOSURE OF THE INVENTION

Problems to be Solved by the Invention

In a conventional aquarium overflow device disclosed in the abovementioned Patent Document 1, even in cases where the discharge pump of the filtering device stops and therefore the returning of the water in the filtering device to the aquarium is interrupted, the water in the aquarium will be continuously supplied to the filtering device via the siphon pipe unless the water level of the aquarium drops lower than the inlet side end portion of the siphon pipe. This causes excessive water supply to the filtering device, which in turn may cause a water level exceeding an allowable water level or even the water overflow.

The present invention was made in view of the aforementioned and/or other problems of the related technique. Preferable embodiments of the present invention can improve remarkably existing methods and/or apparatuses.

The present invention was made to solve the problems of the aforementioned prior art and aims to provide an aquarium overflow device capable of preventing unintentional supplying of the water in the aquarium to an outside of the aquarium.

The other objects and advantages of the present invention will be apparent from the following preferable embodiments.

Means to Solve the Problems

In order to attain the aforementioned objects, the present invention has the following structure.

[1] An aquarium overflow device for supplying water in an aquarium to an external device disposed outside the aquarium, the overflow device comprising:

an inverted U-shaped siphon pipe for supplying the water in the aquarium to an outside of the aquarium, the siphon pipe having an inlet side end portion to be disposed in the aquarium and an outlet side end portion to be disposed outside the aquarium;

suction means connected to an upper portion of the siphon pipe and configured to suck an inside of the siphon pipe; and air introducing means for introducing air into the upper portion in the siphon pipe when suction by the suction means is stopped.

In the present invention, the air introducing means is configured to directly introduce air into the upper portion of the siphon pipe, which is different from introducing air from an end portion of the siphon pipe.

The upper portion of the siphon pipe is a part constituted by a returning portion of the siphon pipe or the vicinity thereof.

[2] The aquarium overflow device as recited in the aforementioned Item 1, further comprising an inverted U-shaped discharge pipe having an inlet side end portion disposed outside the aquarium and an outlet side end portion disposed inside the aquarium, wherein it is configured such that water fed from the external device is introduced into the discharge pipe from the inlet side end portion and then discharged into the aquarium from the outlet side end portion by water supply means, wherein a backward flow preventing opening is provided at an upper portion of the discharge pipe, and wherein it is configured such that when water supply from the external device by the water supply means is stopped, air is introduced into the discharge pipe from the backward flow preventing opening to prevent backward flow of the water.

[3] The aquarium overflow device as recited in the aforementioned Item 2, wherein the suction means includes a suction tube having one end connected to the upper portion of the siphon pipe, a suction pump connected to the other end of the suction tube, and a connection tube having one end connected to the upper portion of the siphon pipe and the other end connected to an upper portion of the discharge pipe, wherein the connection tube doubles as the air introducing means, and wherein, when the suction pump and the water supply means are being driven, an inside of the siphon pipe is sucked by a suction function caused by a water flow in the discharge pipe via the connection tube and also an inside of the siphon pipe is sucked by the suction pump via the connection tube, on the other hand, when the suction pump and the water supply means are stopped, the air introduced into the discharge pipe from the backward flow preventing opening is introduced into the siphon pipe via the connection tube.

[4] The aquarium overflow device as recited in the aforementioned Item 2, wherein as the suction means and the air introducing means, a connection tube having one end connected to the upper portion of the siphon pipe and the other end connected to an upper portion of the discharge pipe is provided, and wherein, when the suction pump and the water supply means are being driven, an inside of the siphon pipe is sucked by a suction function caused by a water flow in the discharge pipe via the connection tube, on the other hand, when the suction pump and the water supply means are stopped, the air introduced into the discharge pipe from the backward flow preventing opening is introduced into the siphon pipe via the connection tube.

The aquarium overflow device as recited in the aforementioned Item 1 or 2, wherein the suction means includes a suction tube having one end connected to an upper portion of the siphon pipe and a suction pump connected to the other end of the suction tube, wherein the air introducing means includes an air introducing tube having one end connected to the upper portion of the siphon pipe and a control valve connected to the other end of the air introducing tube and configured to open and close in response to driving/stopping of the suction pump, and wherein when the suction pump is being driven, the control valve is maintained in a closed state and an inside of the siphon pipe is sucked by the suction pump via the suction tube, on the other hand, when the suction pump is stopped, the control valve is kept open so that air is introduced into the siphon pipe via the air introducing tube.

Effects of the Invention

According to the aquarium overflow device of the invention [1], in the event that the driving of the suction means is stopped by, e.g., power failure, since air is introduced into the middle upper portion of the siphon pipe, suction of the water in the aquarium into the siphon pipe is intercepted by the introduced air, which in turn can immediately stop water supply by the siphon pipe.

According to the aquarium overflow device of the invention [2], in the event that driving of the water supply means is stopped by, e.g., power failure, since air is introduced into the discharge pipe via the backward flow preventing opening, backward flow of the water in the aquarium to the discharge pipe can be prevented, which in turn can prevented water supplying of the water to the external device.

According to the aquarium overflow device of the inventions [3] to [5], at the time of, e.g., power failure, air is assuredly introduced into the siphon pipe, which more assuredly prevent unexpected water suction by the siphon pipe.

BRIEF EXPLANATION OF THE DRAWINGS

FIG. 3 is an exploded perspective view of the overflow device of the first embodiment.

BEST MODE FOR CARRYING OUT THE INVENTION

First Embodiment

Figure 1:
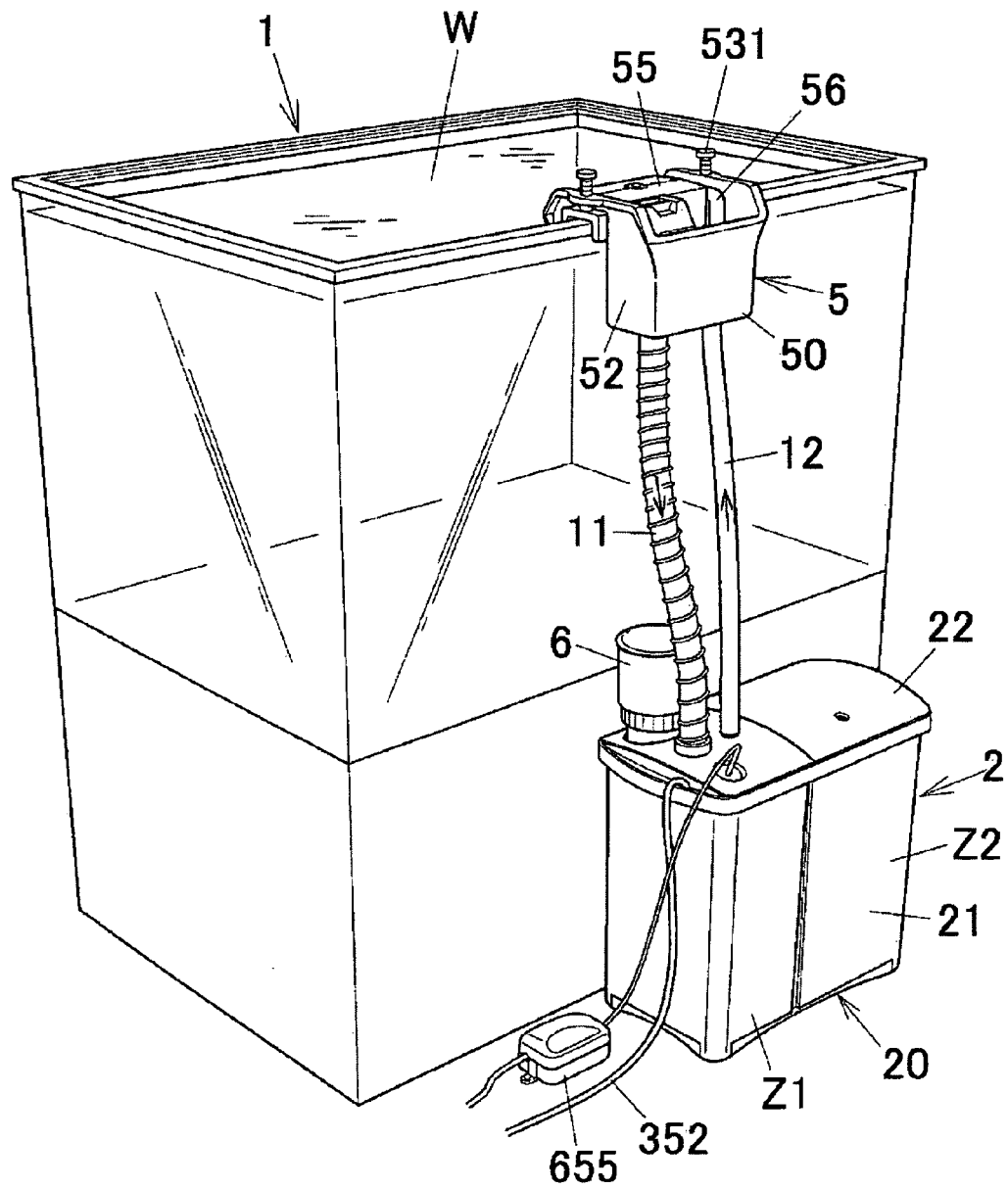
FIG. 1 is a perspective view showing an aquarium system according to a first embodiment of the present invention.

FIG. 1 is a perspective view showing an aquarium system according to a first embodiment of the present invention. As shown in the figure, the aquarium system includes, as fundamental structural elements, an aquarium 1, an independent installation type filtering device 2 which is to be installed independently from the aquarium 1, an overflow device 5 for discharging water W from and introducing water W to the aquarium 1, an inlet hose 11, such as, e.g., an inlet pipe, for supplying water from the overflow device 5 to the filtering device 2, and an outlet hose 12, such as, e.g., an outlet pipe, for sending water from the filtering device 2 to the overflow device 5.

<Overflow Device>

As shown in FIGS. 1 to 4, the overflow device 5 is equipped with an overflow box 50 to be straddled on the side wall upper end of the aquarium 1. In the overflow box 50, a siphon pipe 55, a discharge pipe 56, and a sound insulating cover 57 are mounted.

The overflow box 50 is constituted by an integrally formed resin molded article including a box-shaped tank-inside water storage portion 51 having an open upper end and configured to be disposed along a side wall inner surface of the aquarium 1, a box-shaped tank-outside water storage portion 52 having an open upper end and configured to be disposed along a sidewall outer surface of the aquarium 1, and a bridge connection portion 53 bridging upper end portions of both the water storage portions 51 and 52 and connecting both the water storage portions 51 and 52.

One side wall portion of the tank-inside water storage portion 51 has a number of vertically extended slit-like water passage holes 511 arranged in parallel in the horizontal direction at certain intervals, so that the water W in the aquarium flows into the tank-inside water storage portion 51 via the water passage holes 511.

The one side wall portion of the tank-inside water storage portion 51 is provided, at the lower end edge portion thereof, with a discharge opening 512 to which a discharge nozzle 513 is connected.

The siphon pipe 55 is constituted by an inverted U-shaped or inverted ⊐-shaped wide-width tubular member and configured so that the inlet side end portion is placed in the tank-inside water storage portion 51, the intermediate bent portion is placed on the bridge connection portion 53, and the outlet side end portion is placed in the tank-outside water storage portion 52. Thus, in the state in which the siphon pipe 55 is filled with water W, if the water level at the side of the tank-inside water storage portion 51 is higher than the water level at the side of the tank-outside water storage portion 52, the water W in the tank-inside water storage portion 51 is fed to the side of the tank-outside water storage portion 52 via the siphon pipe 55 due to the difference in atmospheric pressure.

At the upper center of the intermediate bent portion (upper portion) of the siphon pipe 55, a suction hole 555 is provided. To this suction hole 555, a water suction intercept mechanism 8, which will be detailed, is connected.

At one end portion of the lower wall of the tank-outside water storage portion 52, an inlet hose connection 521 is provided. Corresponding to this connection 521, an overflow pipe 54 having a specified height is also provided on the lower wall upper surface of the water storage portion 52.

The inlet side end portion of the inlet hose 11 made of a flexible hose is connected to the lower side of the inlet hose connection 521. The outlet side end portion of the inlet hose 11 is connected to the filtering device 2 as will be explained later so that the water W flowing out of the overflow device 5 is introduced into the filtering device 2 via the inlet hose 11.

The tank-outside water storage portion 52 is provided with a sound insulating cover 57. This sound insulating cover 57 is formed into an above-water portion entirely covering type which covers the peripheral four sides and the upper surface of the region including the overflow pipe 54 above the water surface. Furthermore, the sound insulating cover 57 is provided with water flowing cutout portions 571 at the lower end of the peripheral side walls so that the water W stored in the tank-outside water storage portion 52 can flow into the sound insulating cover 57, i.e., the overflow pipe 54 side, via the water flowing cutout portions 571.

Air release holes 572 and 572 are formed in the upper wall of the sound insulating cover 57 so that the inside of the sound insulating cover 57 can be maintained to the atmosphere pressure by allowing the air to flow in and out of the sound insulating cover 57 via the air release holes 572.

At the other end portion of the lower wall of the tank-outside water storage portion 52, an outlet hose connection 523 is provided.

A discharge pipe 56 disposed in the overflow box 50 is formed into an inverted U-shape or ⊓-shape. The inlet side end portion of the discharge pipe 56 is fluidly communicated with the connection 523 of the tank-outside water storage portion 52. The middle bent portion is disposed along the bridge connection portion 53, and the outlet side end portion is fluidly communicated with the discharge nozzle 513 of the discharge opening 512 of the tank-inside water storage portion 51.

Figure 5:
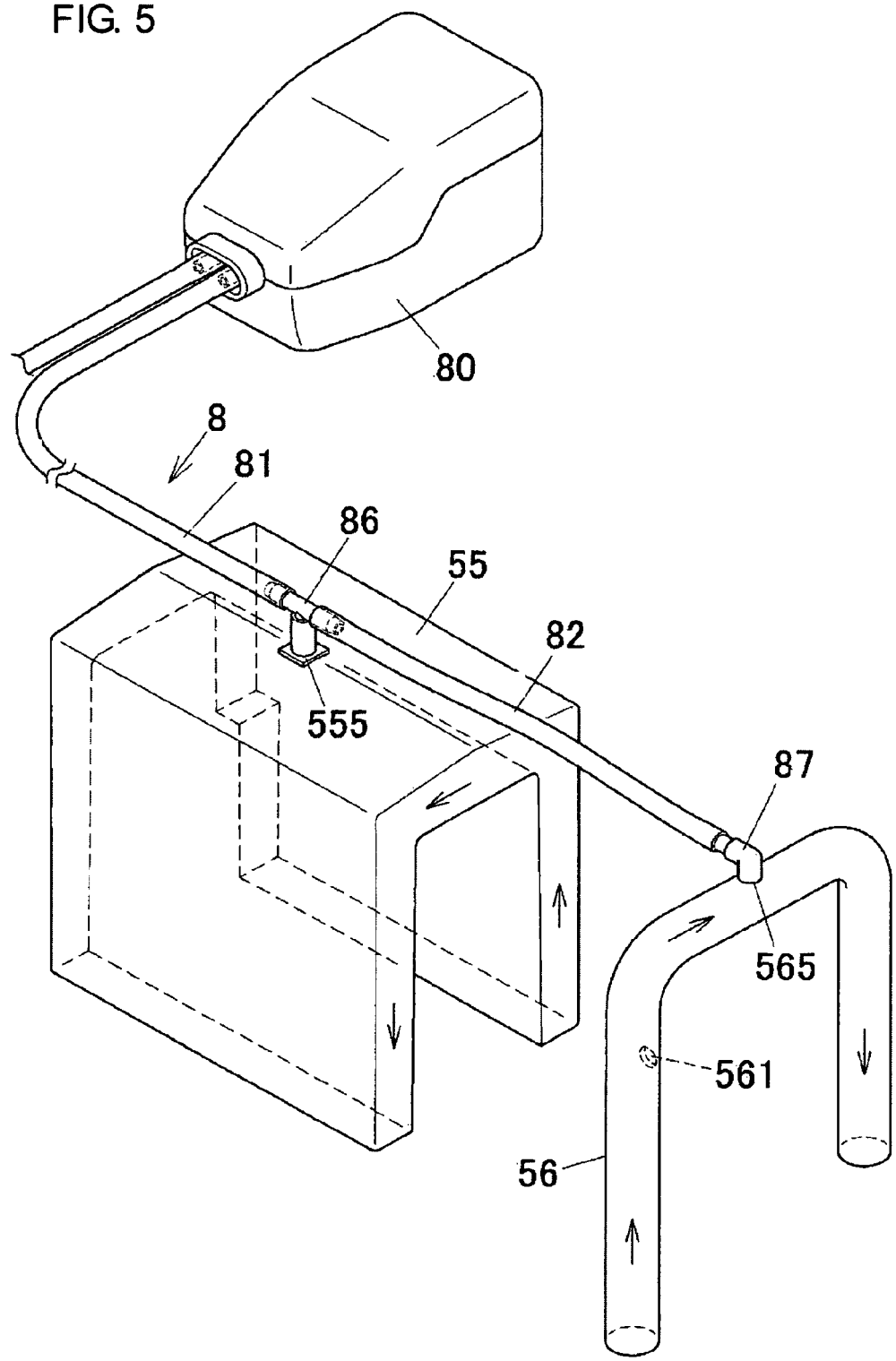
FIG. 5 is a perspective view of the water suction interrupt mechanism and its vicinity of the overflow device of the first embodiment.
Figure 6:
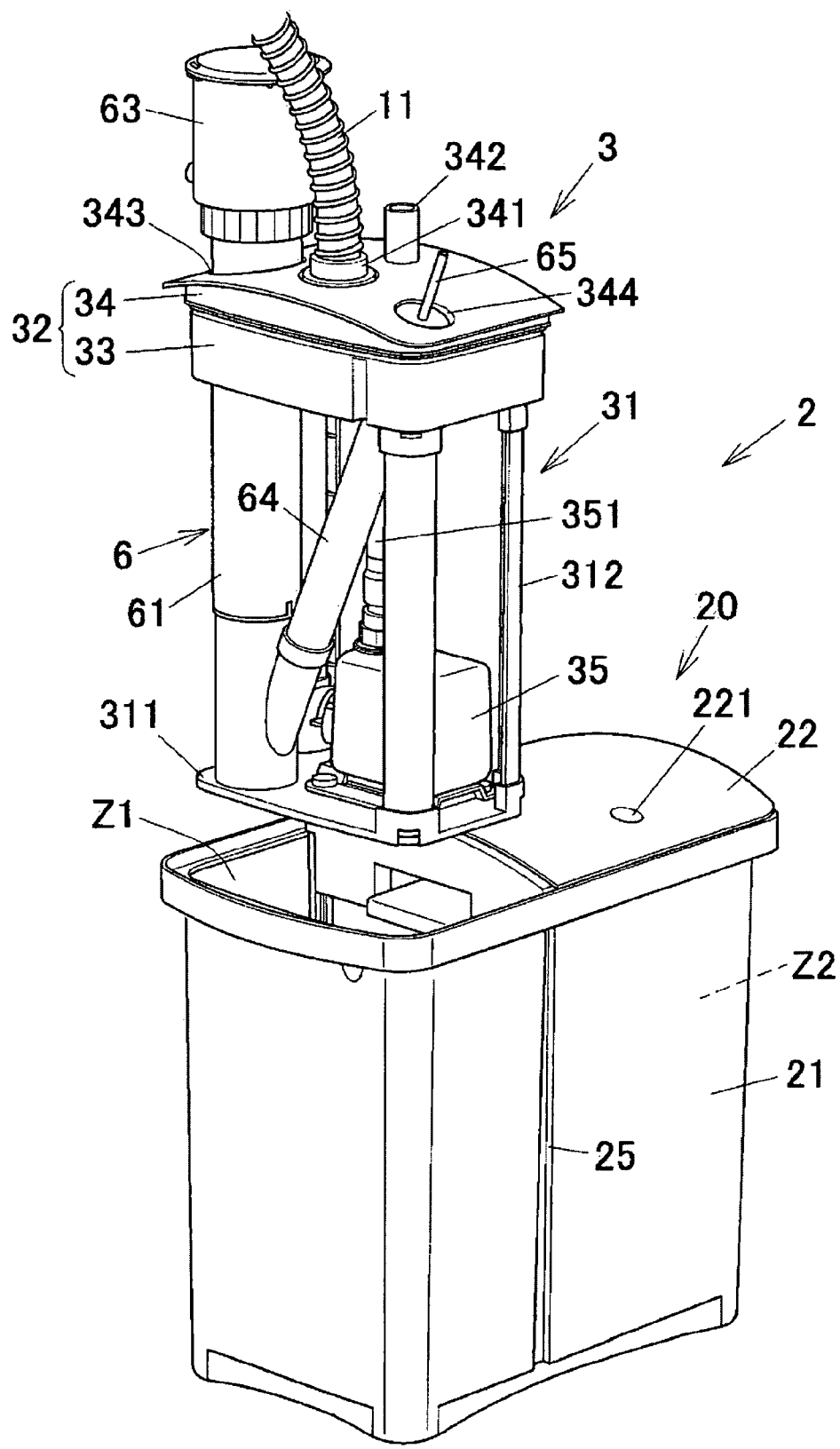
FIG. 6 is a perspective view of the filtering device applied to the aquarium system of the first embodiment in which the functional component unit is pulled put.
Figure 7:
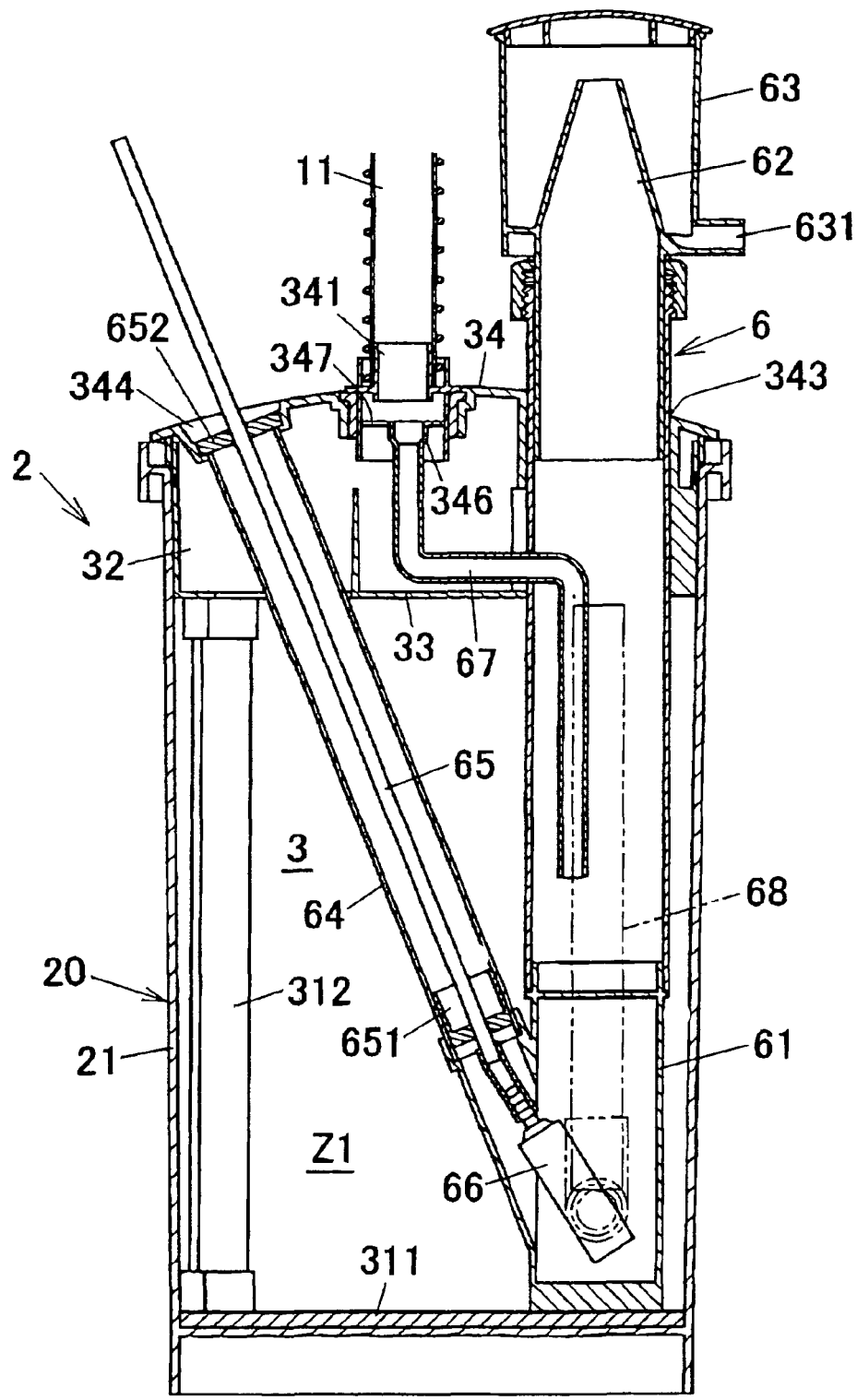
FIG. 7 is a front cross-sectional view of the filtering device of the first embodiment.

As shown in FIGS. 3 and 5, at the upper end portion of the tank-inside pipe portion of the discharge pipe 56, a backflow preventing hole 561 is provided. As will be explained later, this backflow preventing hole 561 prevents the water W in the aquarium from flowing back to the side of the filtering device 2 from the side of the discharge pipe 56 in the event that the discharge pump 35 suddenly stops due to, e.g., unexpected situations.

To the lower side of the outlet hose connection 523 of the overflow device 5, an outlet side end portion of the outlet hose 12 is connected. While, the inlet side end portion of the outlet hose 12 is connected to the filtering device 2 as will be explained later. The water W discharged from the filtering device 2 is introduced into the overflow device 5 via the outlet hose connection 523 via the outlet hose 12, and the water is then discharged into the aquarium from the discharge nozzle 513 via the discharge pipe 56.

Furthermore, at the upper center of the intermediate bent portion (upper portion) of the discharge pipe 56, a suction hole 565 is provided. To the suction hole 565, the water suction intercept mechanism 8, which will be explained later, is connected.

Figure 2:
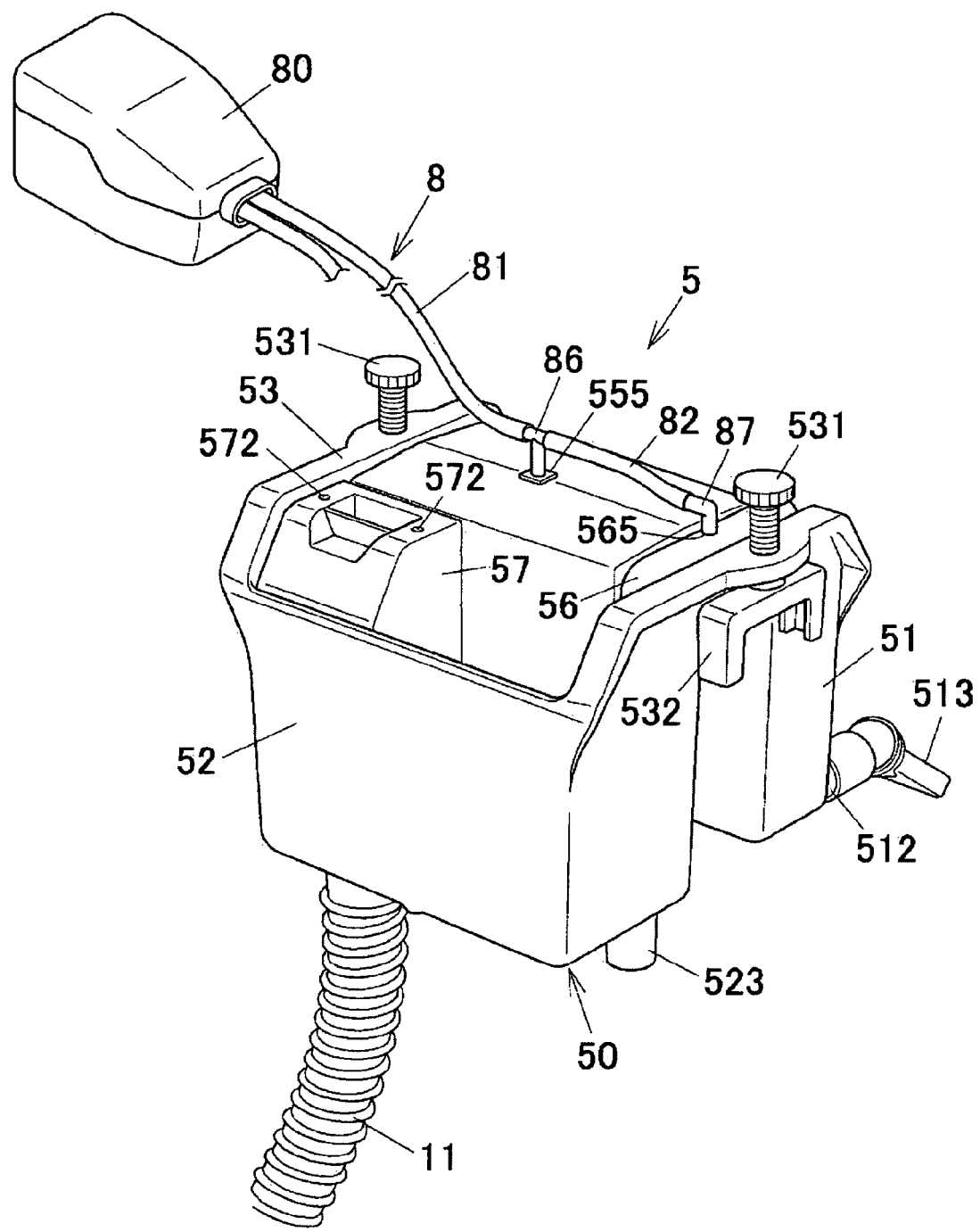
FIG. 2 is a perspective view showing an overflow device applied to the aquarium system of the first embodiment.
Figure 4:
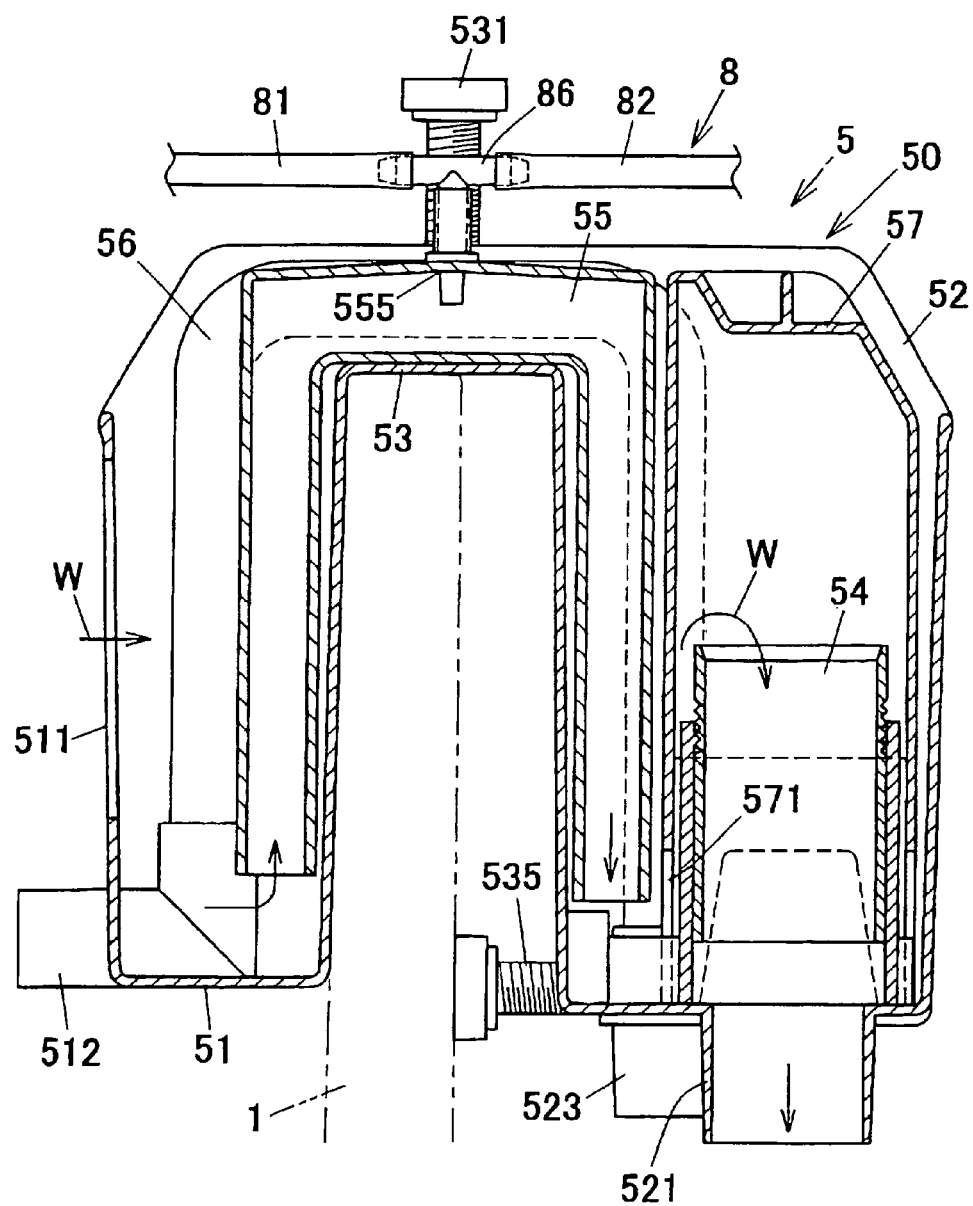
FIG. 4 is a side cross-sectional view of the overflow device of the first embodiment.

As shown in FIGS. 2, 4 and 5, the water suction intercept mechanism 8 of this overflow device 5 is equipped with, e.g., a suction pump 80, a suction tube 81, a connection tube 82, a T-shaped pipe joint 86, a pipe joint member 87, etc.

The T-shaped pipe joint 86 has three connecting portions communicated with each other. The first connecting portion of this pipe joint 86 is fluidly connected to the suction hole 555 of the siphon pipe 55. Furthermore, the second connecting portion of the pipe joint 86 is fluidly connected to one end of the suction tube 81. Also fluidly connected to the third connecting portion of the pipe joint 86 is one end of the connection tube.

At the other end of the suction tube 81, an electrically-operated suction pump 80 as suction means is connected so that the inside of the suction tube 81 is sucked by the suction operation of this pump 80.

The other end of the connection tube 82 is fluidly connected to the suction hole 565 of the discharge pipe 56 via the pipe joint member 87.

In the water suction intercept mechanism 8, in the state in which water is normally circulating, a negative pressure is given to the inside of the suction tube 81 by the suction pump 80, which causes suction of the water or air (bubbles) in the siphon pipe 55 toward the pump 80 via the suction tube 81. At the same time, the flowing of the water in the discharge pipe 56 causes a negative pressure in the connection tube 82, which causes suction of water and/or air (bubbles) in the siphon pipe 55 into the discharge pipe 56 via the connection tube 82. Although the detail explanation will be made later, in the overflow device 5 of this embodiment, it is configured such that, in cases where the driving of the suction pump 80 and/or the discharge pump 35, which will be explained later, is interrupted due to, e.g., power failure, air will be introduced into the siphon pipe 55 to immediately stop supply of water (suction of water) by the siphon pipe 55.

As shown in FIGS. 2 and 3, the overflow device 5 is provided with height adjusting screws 531 and 531 on both sides of the bridge connection portion 53. The shaft tip end of each of the screws 531 and 531 is in contact with the upper end surface of the aquarium side wall via the contact frame

532. By adjusting the height of the overflow device 5 with respect to the aquarium 1 by changing the screwed amount of each of the screws 531 and 531, the water level in the overflow device 5 can be adjusted.

The overflow device 5 is provided with a perpendicular attitude control screw 535 on the lower surface of the tank-outside water storage portion 52 via the screw tube member 536. The head portion of the screw 535 is in contact with the outer surface of the aquarium side wall. Therefore, by adjusting the distance between the bottom portion of the tank-outside water storage portion 52 and the aquarium outer wall surface by changing the screwed amount of the screw 535, the horizontal attitude of the overflow device 5 can be adjusted.

[Filtering Device]

As shown in FIGS. 6 to 9, the filtering device 2 is equipped with a casing main body 21 having an opening at its upper end.

In this casing main body 21, the front portion constitutes a functional component zone Z1 and the rear side behind the functional component zone Z1 constitutes a filtration zone Z2.

A functional component unit 3 is disposed in the functional component zone Z1 of the casing main body 21, and a filtration unit 4 is disposed in the filtration zone Z2.

On the side wall inner surfaces of the casing main body 21, guide protrusions 25 continuously extending vertically between the functional component zone Z1 and the filtration zone Z2 are formed.

Among the upper openings of the casing main body 21, the upper opening at the side of the functional component zone Z1 is covered with an upper wall member 34 of the functional component unit 3, and the upper opening at the side of the filtration zone Z2 is covered with a casing lid 22.

In this first embodiment, the casing main body 21, the casing lid 22 and the upper wall member 34 of the functional component unit 3 constitute the casing 20.

[Functional Component Unit]

As shown in FIGS. 6 to 11, the functional component unit 3 includes a unit frame 31, a discharge pump 35, a protein skimmer 6, various connection members, and various pipes.

The unit frame 31 is provided with a base plate 311 having a rectangular shape as seen from the top to be placed on the bottom surface of the casing main body 21, three vertical frames 312 upwardly extended from three corners of the base plate 311, and an inlet chamber 32 positioned at the upper side of the vertical frames 312.

Further, the inlet chamber 32 has an inlet chamber main body 33 supported by the upper ends of the vertical frames 312 and an upper wall member 34 detachably attached to the upper end opening portion of the inlet chamber main body 33.

The inlet chamber main body 33 is disposed so that the upper end open portion thereof corresponds to the upper end opening portion at the side of the functional component zone Z1 of the casing main body 21. Therefore, the upper wall member 34 closing the upper end opening portion of the inlet chamber main body 33 also functions as a lid member (a part of the upper wall) of the casing main body 21.

The upper wall member 34 has an inlet hose connection 341, an outlet hose connection 342, a protein skimmer connection 343 and a stone replacement operation portion 344.

To the inlet hose connection 341, the outlet side end portion of the inlet hose 11 connected to the overflow device 5 is fluidly connected. While, to the outlet hose connection 342, the inlet side end portion of the outlet hose 11 connected to the overflow device 5 is fluidly connected.

Figure 12:
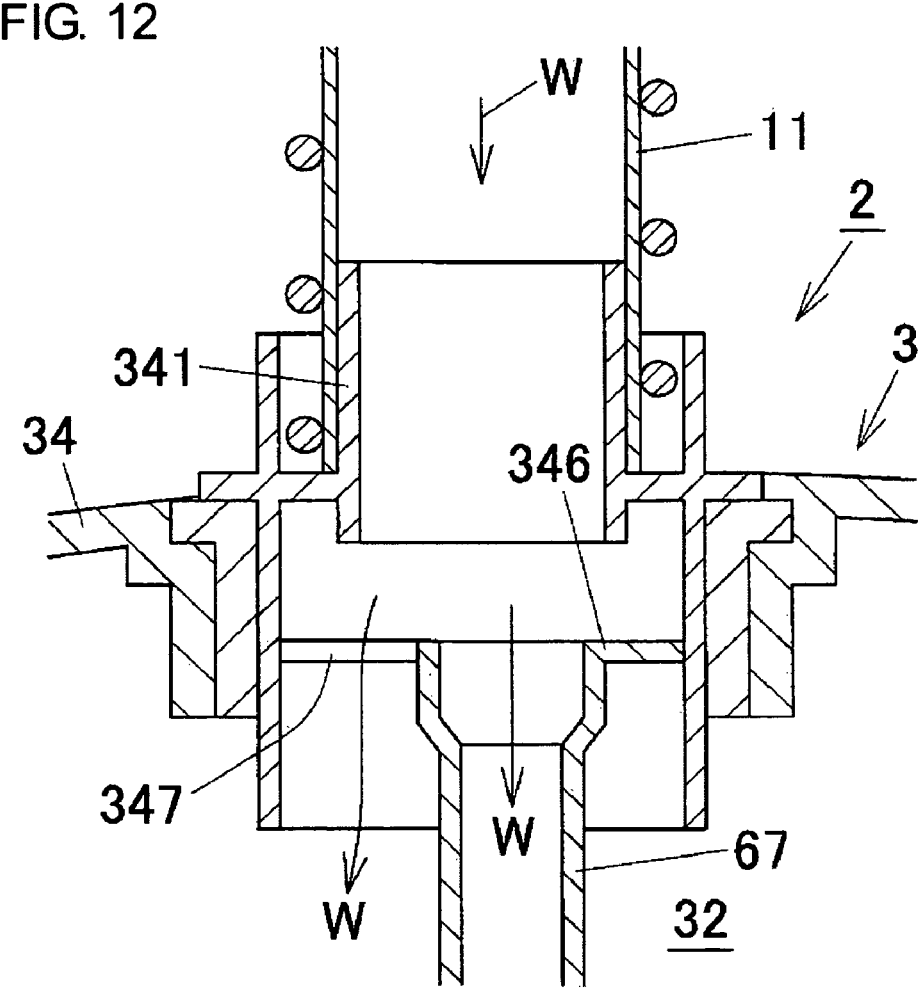
FIG. 12 is a front cross-sectional view of the flow dividing plate portion of the water introducing portion of the filtering device of the first embodiment.

The inlet hose connection 341 has, at the lower surface side of the upper wall member 34, a flow dividing plate 346. As shown in FIG. 12, this flow dividing plate 346 has chamber communication holes 347 communicated with the inlet chamber 32, and is connected to the inlet side end portion of the protein skimmer connection pipe 67. Thus, among the water W introduced through the inlet hose 11, a part of the water W is introduced into the protein skimmer 6 via the protein skimmer connection pipe 67, while the rest of the water W is introduced into the inlet chamber 32 via the chamber communication holes 347.

In the rear wall of the inlet chamber main body 33, a filtration zone communication opening 331 communicated with the filtration zone Z2 is formed. The water W introduced into the inlet chamber 32 via the inlet hose connection 341 is introduced into the filtration zone Z2 through the filtration zone communication opening 331.

The discharge pump 35 is fixed to the upper surface of the base plate 311 of the unit frame 31. The outlet port of the discharge pump 35 is in fluid communication with the lower end of the discharge pipe 351. The upper end of this discharge pipe 351 is penetrated through the inlet chamber 32 and is in fluid communication with the discharge hose connection 342 of the upper wall member 34. Thus, it is configured such that the water W stored in the bottom portion of the casing main body 21 is fed to the discharge pipe 351 by the discharge pump 35 and then the water W passes through the outlet hose 12 to be supplied to the overflow device 5.

The protein skimmer 6 has a vertically disposed skimmer main pipe 61 with the lower end fixed to the base plate 311 of the unit frame 31. The upper end of the skimmer main pipe 61 penetrates the inlet chamber 32 to be disposed above the upper part of the upper wall member 34.

Within the upper end portion of the skimmer main pipe 61, a tapered pipe 62 with a radius gradually decreasing towards the upper portion thereof is provided. Further provided is a protein skimmer cup 63 covering the upper tapered portion of the tapered pipe 62. This protein skimmer cup 63 is provided with a discharge spout 631 for discharging organic series contaminants, such as, e.g., protein, accumulated in the cup as will be described later.

The protein skimmer connection pipe 67 penetrates in the upper portion of the skimmer main pipe 61, so that a part of the water W divided by the flow dividing plate 346 in the chamber upper wall member 34 is introduced into the skimmer main pipe 61 of the protein skimmer 6 via the connection pipe 67.

In the protein skimmer 6, the lower end of the inclined pipe 64 is fluidly connected to the lower end portion of the skimmer main pipe 61. The inclined pipe 64 is placed so that it extends obliquely upward from the lower end portion of the skimmer main pipe 61. The upper end of the inclined pipe 64 penetrates the inlet chamber 32 to be connected to the stone replacement operation portion 344 of the upper wall member 34.

The inclined pipe 64 is provided with blocking members 651 and 652 fitted and attached to the upper end and the lower end of the inclined pipe 64. Also, in the inclined pipe 64, a hard air supplying pipe 65 is disposed in a state in which the pipe penetrates both the blocking members 651 and 652. The tip end of the air supplying pipe 65 is placed at the lower end portion of the skimmer main pipe 61.

A wood stone 66 as a bubble generating means is placed at the lower end portion of the skimmer main pipe 61, and the wood stone 66 is communicated with the tip end of the air supplying pipe 65. The wood stone 66 is formed into an elongated cylindrical shape with a diameter smaller than the inner diameter of the inclined pipe 64 so that it can be inserted in the inclined pipe 64. Therefore, by pulling out the air supplying pipe 65 from the inclined pipe 64, the wood stone 66 can be taken out from the skimmer main pipe 61 together with the air supplying pipe 65 via the inclined pipe 64. On the other hand, by inserting the air supplying pipe 65 into the inclined pipe 64 from the upper end portion together with the wood stone 66 attached to the tip end of the air supplying pipe 65, the wood stone 66 can be placed at a predetermined position in the lower portion of the skimmer main pipe 61.

In this way, the wood stone 66 can be taken in and out without troublesome operations, such as, disassembling operations of the other components.

The wood stone 66 has a number of fine pores, and can generate a number of bubbles by supplying air to the wood stone 66 via the air supplying pipe 65 in a state in which the wood stone 66 is immersed in the stored water W in the skimmer main pipe 61. Organic series contaminants, such as, e.g., protein, contained in the water adhere to the generated bubbles, and they move upwards. The upwardly moved proteins further go up through the skimmer main pipe 61 to be discharged from the upper end of the tapered pipe 62, collected within the protein skimmer cup 63, and then discharged to the outside via the discharge spout 631.

At the peripheral wall lower end of the skimmer main pipe 61 of the protein skimmer 6, the lower end of the overflow pipe 68 is connected. While, the upper end of the overflow pipe 68 is disposed at the lower portion of the inlet chamber 38 of the filtration zone Z1. Thus, when the water W supplied to the skimmer main pipe 61 is stored more than the specified amount, the water W is discharged to the inside of the casing 20 but outside the protein skimmer 6 via the overflow pipe 68.

In the functional component unit 3 having the abovementioned structure, the inlet chamber 32 and the base plate 311 are each formed to have a plane shape corresponding to the plane cross-section of the functional component zone Z1 of the casing main body 21. In the state in which the functional component unit 3 is assembled, the unit 3 can be inserted into and removed from the functional component zone Z1 of the casing main body 21 via the upper end opening thereof. Furthermore, at the time of the insertion/removal operation thereof, the rear ends of both side portions of the inlet chamber 32 and those of the base plate 311 of the unit 3 are engaged with and guided by the guide protrusions 25 formed on the inner side surfaces of the casing main body 21, so that the insertion/removal operation of the unit 3 can be performed smoothly. Furthermore, in a state in which the unit 3 is accommodated, the rear ends of both side portions of the inlet chamber 32 and those of the base plate 311 are engaged with the guide protrusions 25 to be positioned, so that the entire unit 3 is disposed within the casing main body 21 in a fitted manner.

In this first embodiment, despite whether the filtration unit 4, which will be explained later, is accommodated within the casing main body 21, the functional component unit 3 can be inserted and removed from the casing main body 21.

[Filtration Unit]

Figure 8:
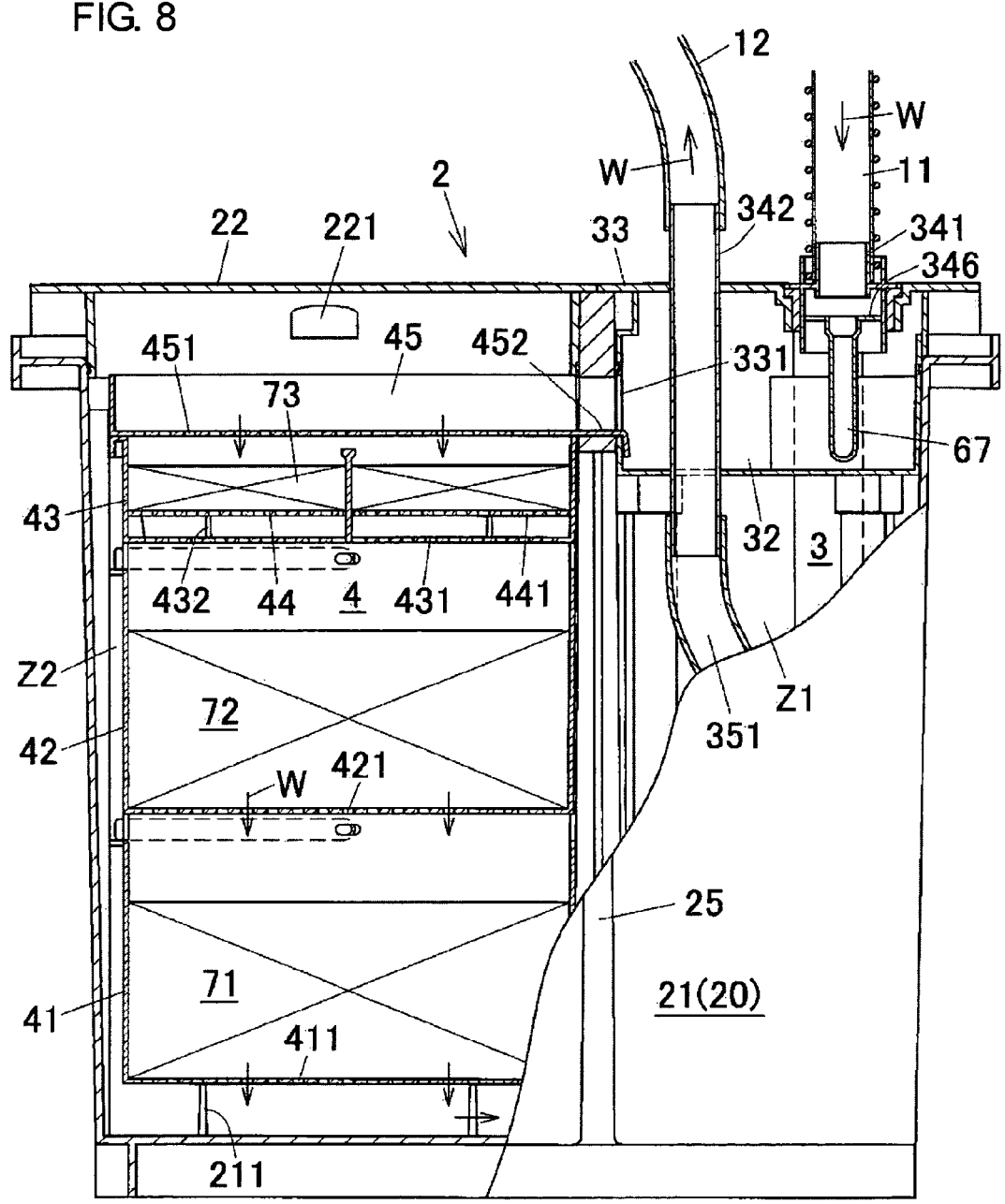
FIG. 8 is a side cross-sectional view of the filtering device of the first embodiment.
Figure 9:
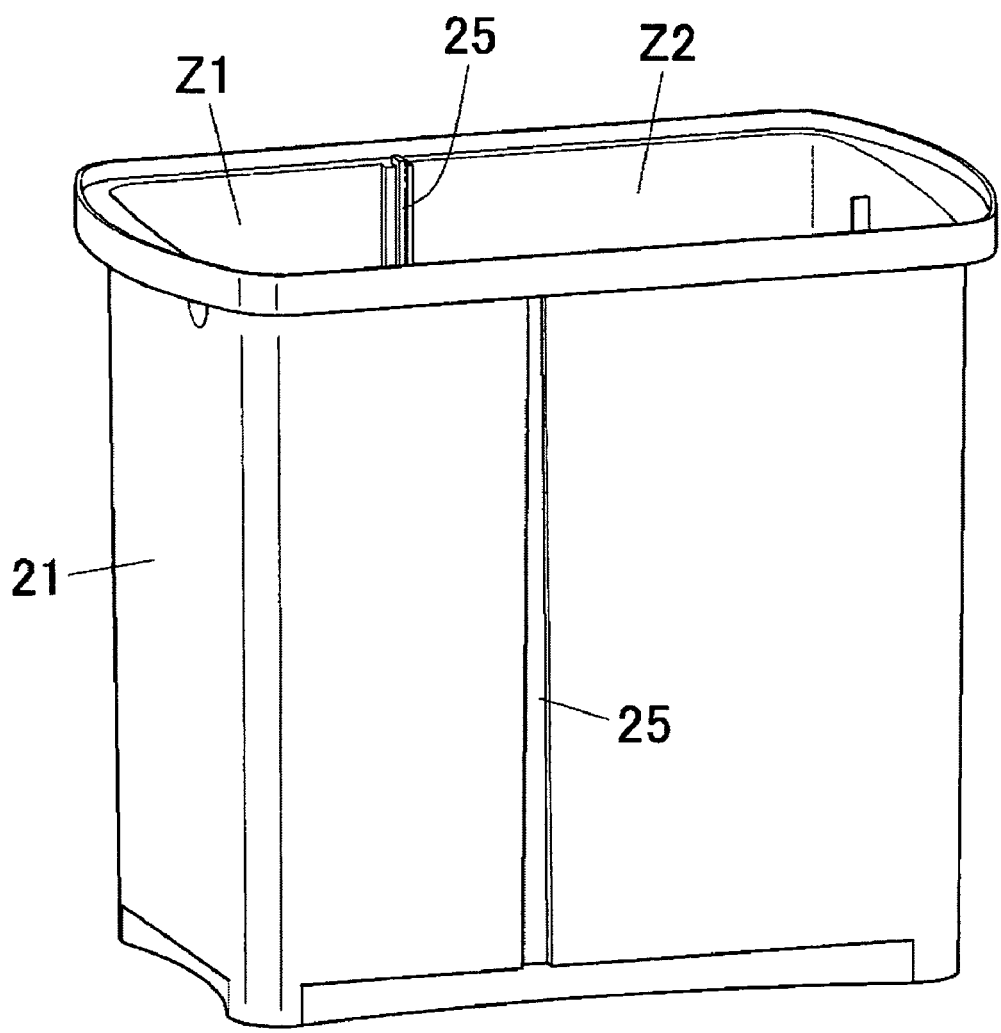
FIG. 9 is a perspective view of a casing main body of the filtering device of the first embodiment.
Figure 10:
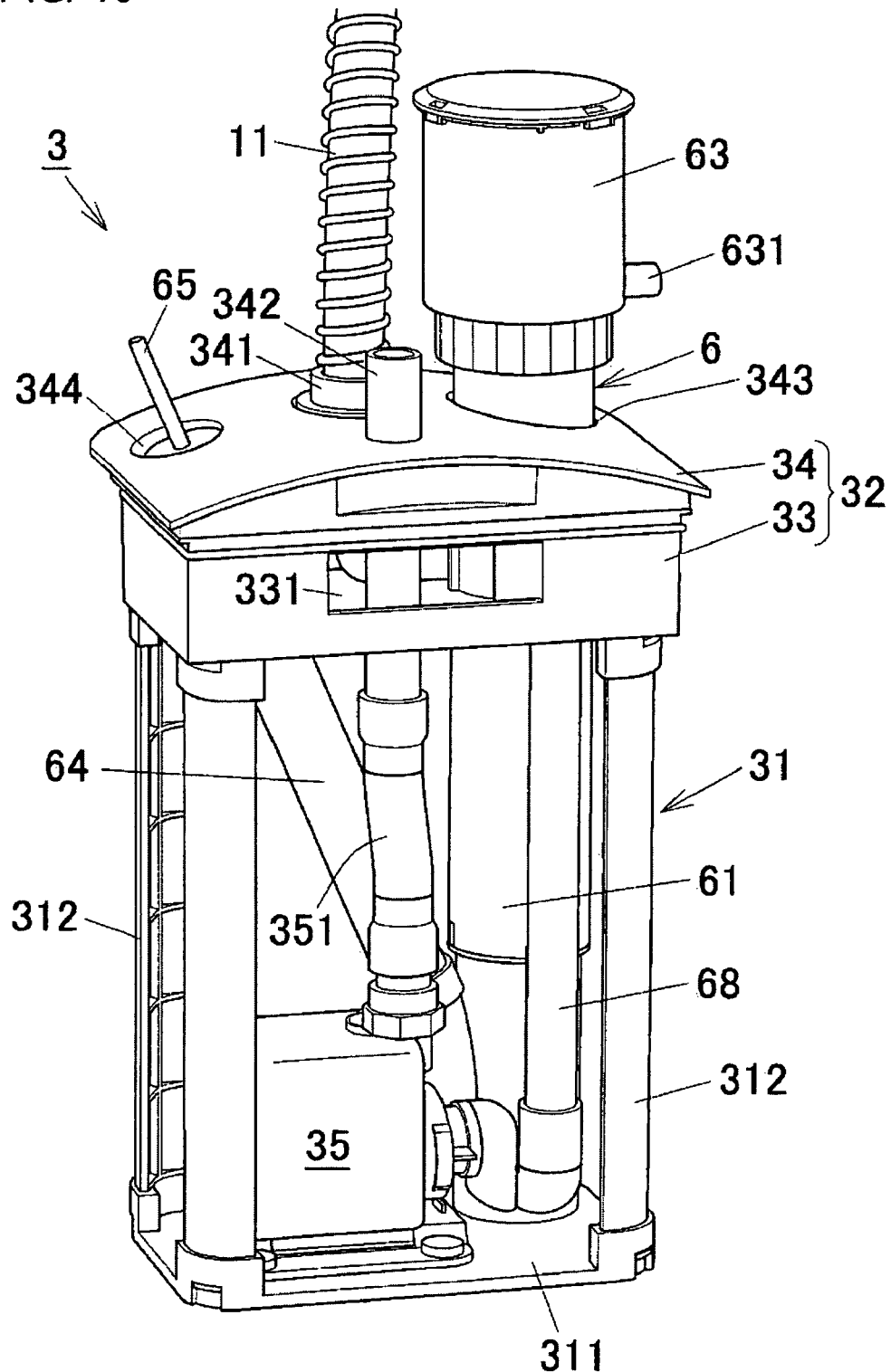
FIG. 10 is a perspective view showing the functional component unit applied to the filtering device of the first embodiment.
Figure 11:
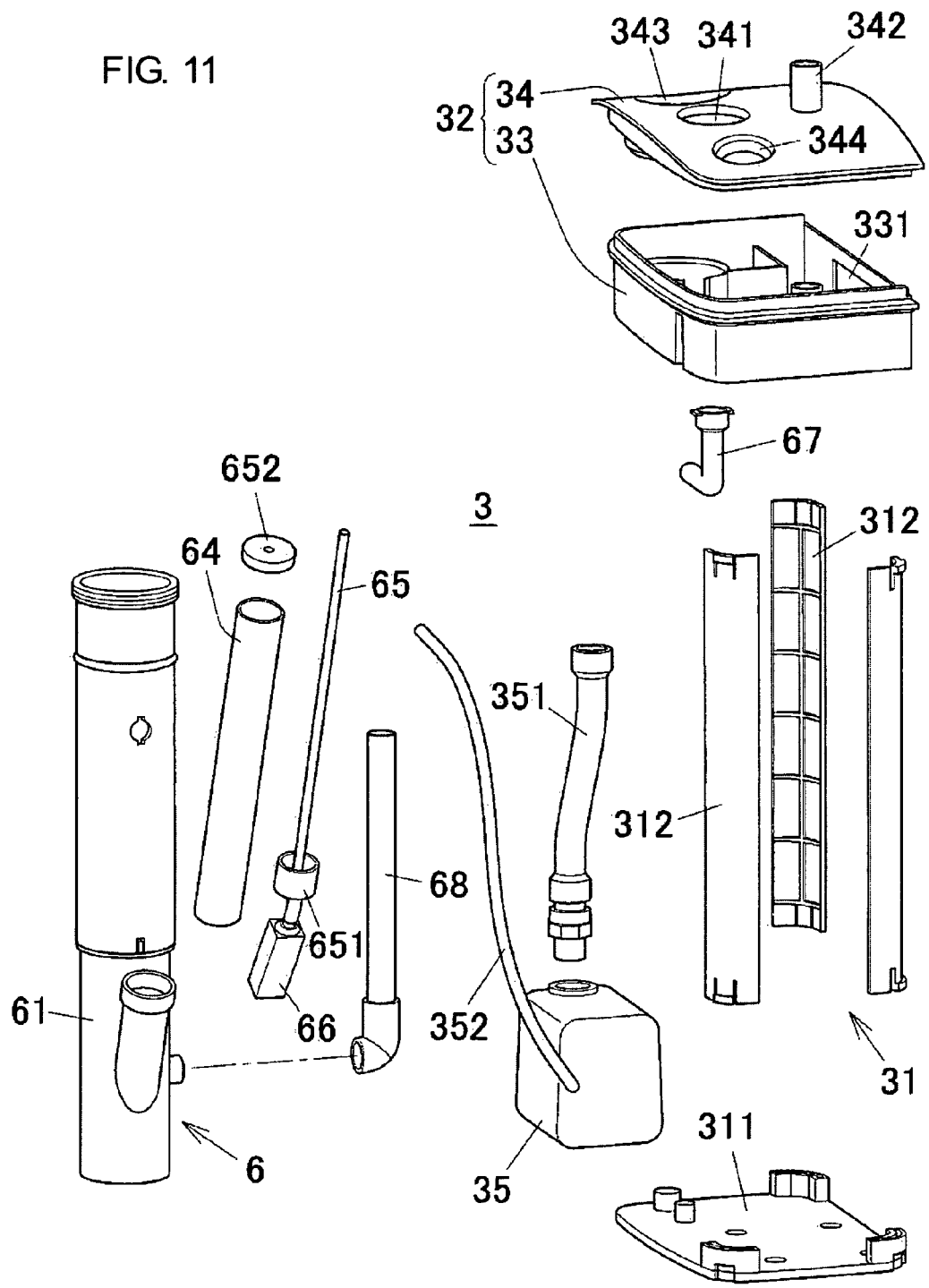
FIG. 11 is an exploded perspective view of the functional component unit of the filtering device of the first embodiment.
Figure 13:
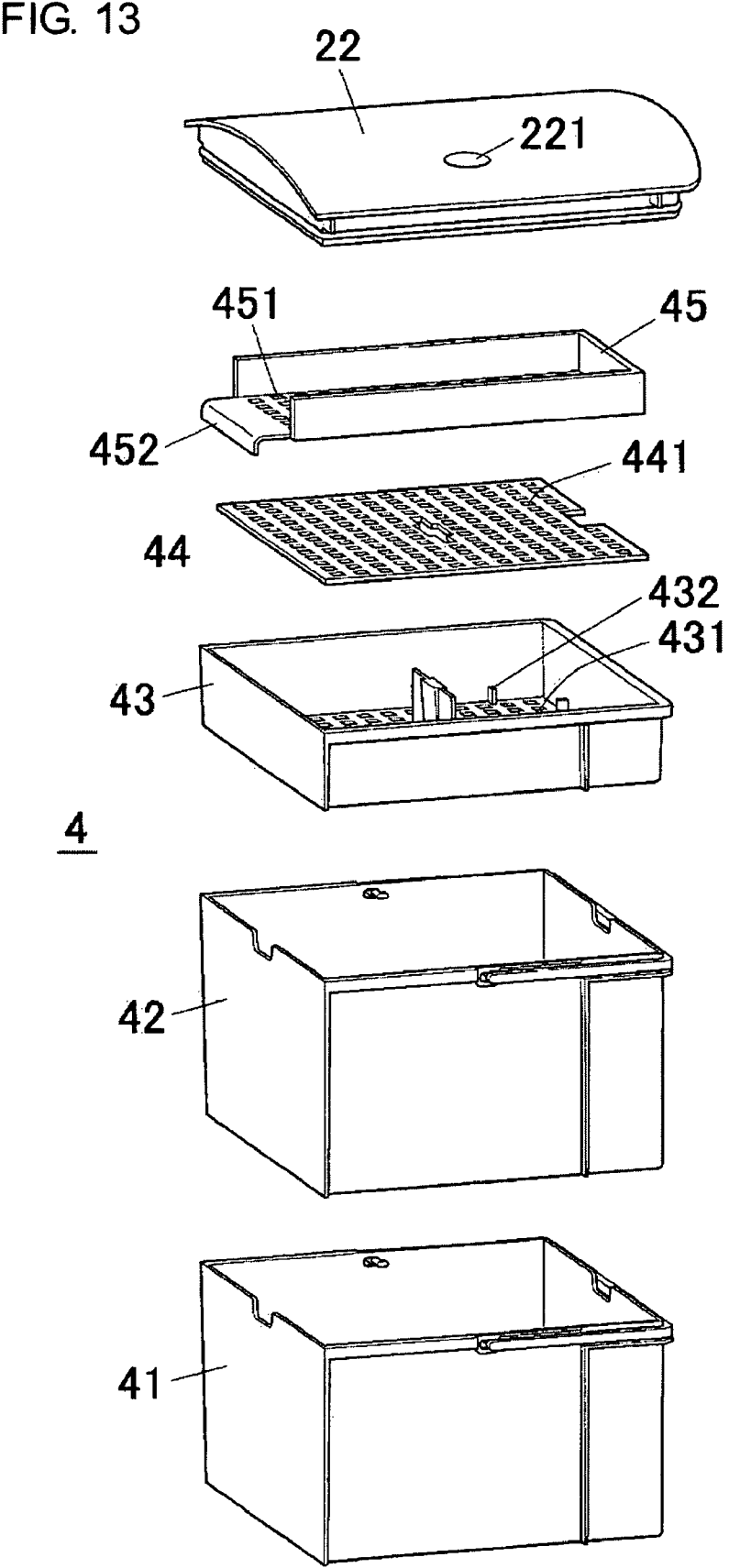
FIG. 13 is an exploded perspective view of the filtering unit of the filtering device of the first embodiment.

As shown in FIGS. 8 and 13, the filtration unit 4 includes a lower bucket 41, a middle bucket 42, a water spray tray 43, a drain board 44 and a gutter member 45.

Each of the buckets 41 and 42 is formed into an upper opened box shape and is provided with a number of water spraying holes 411 and 421 formed in the bottom wall, so that the water W supplied to the inside of the buckets 41 and 42 are poured out downward through the water spraying holes 411 and 421.

On the bottom surface of the casing main body 21 at the side of the filtration zone Z2, spacer protrusions 211 are formed, so that the lower bucket 41 is placed on the spacer protrusions 211. Thus, the lower bucket 41 is accommodated in the filtration zone Z2 of the casing main body 21 with a substantial space formed between the bottom surface of the filtration zone Z2 and the bottom surface of the lower bucket 41.

Furthermore, the middle bucket 42 is accommodated in the filtration zone Z2 of the casing main body 21 with the middle bucket placed on the lower bucket 41.

The water spray tray 43 is formed into an upper opened shallow box shape and has a number of water spraying holes 431 formed in the bottom wall thereof. Also, the water spray tray 43 is provided with spacer protrusions 432 formed on the bottom surface thereof.

The water spray tray 43 is accommodated in the filtration zone Z2 of the casing main body 21 with the water spray tray placed on the middle bucket 42.

The drain board 44 is formed into a shape corresponding to the inner circumferential shape of the water spray tray 43, and has a number of water spraying holes 441.

This drain board 44 is placed on the spacer protrusions 432 of the water spray tray 43. Thus, the drain board 44 is accommodated in the water spray tray 43 in a fitted manner with a substantial space formed between the drain board and the bottom of the water spray tray 43.

The gutter member 45 is formed into an upper opened channel shape and has a number of water spraying holes 451 formed in the bottom wall. The front end (the functional component zone side end portion) of the gutter member 45 is opened, while the rear end is closed.

The gutter member 45 is disposed on the water spray tray 43 via the drain board 44 with the front opened end portion facing the filtration zone communication opening 331 of the inlet chamber 32 of the functional component unit 3.

The gutter member 45 is provided with a water guiding tongue portion 452 forwardly extended from the bottom wall front end thereof. This tongue portion 452 is inserted into the filtration zone communication opening 331 and engaged with the inlet chamber 32 of the functional component unit 3. Consequently, the stored water W in the inlet chamber 32 is guided by the tongue portion 452 and supplied smoothly to the gutter member 45 via the communication opening 331.

In the filtration unit 4 constructed as explained above, it is configured such that each of the constituent components 41 to 45 can be inserted into and detached from the upper end opening of the filtration zone Z2 of the casing main body 21.

The buckets 41 and 42 and the water spray tray 43 are each formed into a shape corresponding to the plan cross-sectional shape of the filtration zone Z2. Therefore, when these members 41 to 43 are insert into or detached from the filtration zone Z2 of the casing main body 21, front both side portions of the buckets 41 and 42 and those of the water spray tray 43 are engaged with and guided by the guiding protrusions 25 formed on the inner side surfaces of the casing 21, so that insertion/removal operation of each of the members 41 to 45 can be performed with high dimensional accuracy. In a state in which the members 41 to 45 are accommodated, front both side portions of the buckets 41 and 42 and those of the water spray tray 43 are engaged with the guide protrusions 25 in a positioned manner, so that each of the members 41 to 45 is accommodated in the casing main body 21 in a fitted manner.

Furthermore, in the first embodiment, despite whether the functional component unit 3 is accommodated in the casing main body 21, it is constituted such that each of the components 41 to 45 of the filtration unit 4 can be inserted into and detached from the casing main body 21.

To the upper end opening of the filtration zone Z2 of the casing main body 21, the aforementioned casing lid 22 is detachably attached via a packing (not shown).

As mentioned above, the casing 20 is constituted by attaching the casing lit 22 and the upper wall member 34 of the functional component unit 3 to the casing main body 21. The interior of the casing 20 is open to the atmosphere. For example, the casing lid 22 has an atmospheric communication opening 221, so that air is allowed to go into and out of the casing 20 via the communication opening 221. Thus, the interior of the casing 20 is open to the atmosphere.

In FIG. 1, the reference numeral "352" denotes a power cord of the discharge pump 35, the reference numeral "655" denotes an air supplying means for supplying air to the wood stone 66 via the air supplying pipe 65.

[Operation of Aquarium System]

In the abovementioned aquarium system, the following operational preparation is performed before the actual operation.

In preparing the operation, as shown in FIG. 8, filtration materials 71 to 73 are initially set to the filtering device 2. In the lower bucket 41 of the filtration unit 4, a filtration material 71, such as, e.g., Siporax, in which anaerobic filtering bacteria can be grown, is accommodated to perform biofiltration. In the middle bucket 42, a filtration material 72, such as, e.g., bio ball, in which aerobic filtration bacteria can be grown, is accommodated to perform biofiltration. Furthermore, in the water spray tray 43, a filtration material 73, such as, e.g., wool or activated carbon, is accommodated via the drain board 44 to perform physical filtration.

Further, as explained above, the overflow device 5 is set so as to straddle the side wall upper end of the aquarium 1. In this state, the tank-inside water storage portion 51 of the overflow device 5 is immersed in the water W in the aquarium to a predetermined level, so that the water W in the aquarium flows into the storage portion 51 via the water passage holes 511. Thus, a specified amount of water is stored in the tank-inside water storage portion 51.

Also accommodated in the tank-inside water storage portion 51 of the overflow device 5 is a physical filtration material (not shown), such as, e.g., sponge.

Furthermore, hoses 11 and 12 are set between the filtering device 2 and the overflow device 5. In detail, the inlet side end portion of the inlet hose 11 is fluidly connected to the inlet hose connection 521 of the overflow device 5, while the outlet side end portion thereof is fluidly connected to the inlet hose connection 341 of the filtering device 2. Also, the inlet side end portion of the outlet hose 12 is fluidly connected to the outlet hose connection 342 of the filtering device 2, while the outlet side end portion thereof is fluidly connected to the outlet hose connection 523 of the overflow device 5. Furthermore, the sound insulating cover 57 is set in the tank-outside water storage portion 52 so as to cover the entire periphery of the overflow pipe 54.

Next, in the tank-outside water storage portion 52 of the overflow device 5 set on the aquarium side wall, water W is filled to a level slightly lower than the water level of the tank-inside water storage portion 51.

After pouring a certain amount of water W in the casing 20 of the filtering device 2, the operation of the aquarium system is initiated. That is, the discharge pump 35 of the filtering device 2 and the suction pump 80 of the overflow device 5 are activated, and air is supplied to the wood stone 66 of the protein skimmer 6.

With this, in the casing 20 of the filtering device 2, water W is fed to the discharge pipe 351 by the discharge pump 35, and the water W is fed to the discharge pipe 56 of the overflow device 5 through the outlet hose 12. The water W fed to the discharge pipe 56 is discharged to the aquarium 1 from the discharge nozzle 513. Thus, the water W in the filtering device 2 is fed to the aquarium 1.

On the other hand, in the overflow device 5, the air in the siphon pipe 55 is sucked from the suction hole 555 of the siphon pipe 55 via the suction tube 81, so that the siphon pipe 55 is filled with water W. The water level difference between the aquarium 1 and the tank-outside water storage portion 52 of the overflow device 5 causes a suction function (siphon phenomenon) of the siphon pipe 55, which in turn causes the water W in the aquarium to be supplied from the tank-inside water storage portion 51 to the tank-outside water storage 52 via the siphon pipe 55. Furthermore, the water W flows into the overflow pipe 54 and is supplied to the casing 20 of the filtering device 2 through the inlet hose 11.

The water W fed to the casing 20 is divided by the flow dividing plate 346 at the inlet hose connection 341, and most of the water W is introduced into the inlet chamber 32 through the chamber communication holes 347, and the remaining water W is introduced into the skimmer main pipe 61 of the protein skimmer 6 through the protein skimmer connection pipe 67.

Protein contained in the water W introduced into the protein skimmer 6 is removed. That is, a wood stone 66 is disposed in the water introduced into and stored in the skimmer main pipe 61, and a number of bubbles are generated from the wood stone 66. The protein in the water adheres to these bubbles, floats, sequentially moves upwards, and gradually goes upward through the skimmer main pipe 61. These ascended bubbles with protein are discharged from the upper end of the tapered pipe 62, collected in the protein skimmer cup 63 and discharged to the outside from the discharge spout 631. Thus, only protein is discharged and removed from the water.

The water W from which protein is removed goes through the overflow pipe 68 of the protein skimmer 6 and discharged into the casing which is outside the protein skimmer 6.

On the other hand, the water W introduced into the inlet chamber 32 is supplied to the gutter member 45 in the filtration zone Z2 through the filtration zone communication opening 331.

While flowing the gutter member 45, the water supplied to the gutter member 45 is dispersed and drops through a number of water spraying holes 451, and is supplied to nearly the entire area of the filtration material 73 of the water spray tray 43 in a dispersed manner.

After physically filtered by the filtration material 73, the water W supplied to the filtration material 73, such as, e.g., wool or activated carbon, passes through the drain board 44, and is dispersed and drops through a number of water spraying holes 431 of the water spray tray 43 and then supplied to nearly the entire area of the filtration material 72 of the middle bucket 42.

The water W supplied to the filtration material 72, such as, e.g., a bio ball, in the middle bucket 42 is biologically filtered by the aerobic filter bacteria adhered to the filtration material 72, and then dispersed and drops through a number of water spraying holes 421 to be supplied to nearly the entire area of the filtration material 71 of the lower bucket 41.

The water W supplied to the filtration material 71, such as, e.g., Siporax, in the lower bucket 41 is biologically filtered by the anaerobic filter bacteria adhered to the filtration material 71, and supplied to the bottom portion of the casing 20 through a number of water spraying holes 511.

The water W filtered as mentioned above flows from the filtration zone Z2 to the functional component zone Z1, and is fed to the discharge pipe 351 by the discharge pump 35 and then supplied to the aquarium 1 in the same manner as mentioned above.

In this way, the water W consecutively circulates between the aquarium 1 and the filtering device 2, and the water W in the aquarium 1 is filtered by the filtering device 2 to be always kept clean.

On the other hand, during the normal operation of this aquarium system, in the water suction intercept mechanism 8 of the overflow device 5, the driving of the suction pump 80 is continuously performed, so that the water and/or air in the siphon pipe 55 is always sucked toward the suction pump 80 via the suction tube 81. At the same time, the suction function caused by the water flow in the suction pipe 56 causes the water or air in the siphon pipe 55 to be always sucked into the discharge pipe 56.

<Effects of Aquarium System>

In the aquarium system of this first embodiment, even if the water pump 35 suddenly stops due to unforeseen situations, such as, e.g., electric power failure, it is prevented that the water W in the aquarium flows backward through the outlet pipe 56 to be supplied to the filtering device 2. It also can be prevented that the water W in the aquarium is supplied to the filtering device 2 by the siphon pipe 55.

In detail, when the water supply to the outlet hose 12 by the discharge pump 35 stops, the water W in the outlet hose 12 flows backward toward the filtering device 2 by the gravitational force of the water, which in turn causes suction of the water W in the aquarium into the inverted U-shaped discharge pipe 56 of the overflow device 5 and starts backward flow. In the first embodiment, however, the backflow preventing hole 561 formed in the upper end portion of the tank-inside pipe portion of the discharge pipe 56 causes introduction of air into the discharge pipe 56 via the backflow preventing hole 561 when the water W in the discharge pipe 56 starts backward flow. This prevents suction of the water W in the aquarium into the discharge pipe 56, which in turn prevents the water in the aquarium from flowing back to the filtering device 2. If there is no backflow preventing hole 561, when the discharge pump 35 stops, the water in the outlet hose 12 starts backward flow. Simultaneously with the backward flow of the water, the water W in the aquarium is sucked into the discharge pipe 56 due to the siphon phenomenon, resulting in backward flow of the water to the filtering device 2.

Furthermore, even in cases where the discharge pump 35 stops, if no countermeasure is taken, the water W in the aquarium will be sucked from the siphon pipe 55 of the overflow device 5 to be supplied to the filtering device 2 through the inlet hose 11. On the other hand, in this embodiment, since the siphon pipe 55 and the discharge pipe 56 are connected via the connection tube 82, the water supply by the siphon pipe 55 can be interrupted. In other words, when the discharge pump 35 stops, the air will be introduced into the discharge pipe 56 as explained above, which causes air to be introduced into the siphon pipe 55 via the backflow preventing hole 561, the discharge pipe 56 and the connection tube 82. At this time, since the suction pump 80 is being stopped due to the power failure, the air introduced into the siphon pipe 55 will not be sucked and/or discharged via the suction tube 81, causing a sufficient amount of air to be introduced into the upper portion of the siphon pipe 55. This air causes the water in the siphon pipe 55 to be divided into the water at the inlet side pipe portion of the siphon pipe 55 and the water at the outlet side pipe portion of the siphon pipe 55. This prevents the water W in the aquarium from being sucked into the siphon pipe 55, resulting in immediate interception of the water supply by the siphon pipe 55.

As will be understood from the above, in this first embodiment, even if the discharge pump 35 suddenly stops due to, e.g., power failure, the backward flow of the water W in the aquarium to the outlet hose 12 can be prevented, and at the same time, the supply of the water W by the siphon pipe 55 can be automatically interrupted without delay. Therefore, troubles, such as, e.g., water overflow or water leakage, due to the backward flow of the water or the excessive supply of the water, can be prevented, which can further improve the performance dependability.

In the first embodiment, even if the water supply by the siphon pipe 55 and the discharge pipe 56 is stopped due to power failure, when the power supply to the discharge pump 35 and the suction pump 80 is resumed by the recovery of the power failure, the system returns to its normal state automatically.

In detail, when the discharge pump 35 is driven, the water in the filtering device 2 will be forcibly discharged into the aquarium via the outlet hose 12 and the discharge pipe 56. When water flow is once generated in the outlet hose 12, in the same manner as a Venturi tube function, a negative pressure will be given to the connection tube 82 from the side of the discharge pipe 56. Accordingly, by this suction function, the air in the siphon pipe 55 is sucked and discharged via the connection tube 82, and at the same time, the driving of the suction pump 80 is resumed, which causes the air in the siphon pipe 55 to be sucked and discharged via the suction tube 81. Thus, the air in the siphon pipe 55 is discharged, causing the water W in the aquarium to be sucked by the siphon pipe 55 and supplied to the filtering device 2.

When the power failure is recovered, the system will return to its normal state, and therefore no troublesome restoration operations will be required and it becomes possible to prevent harmful influences due to power failure during owner's absence.

In the filtering device 2 of this first embodiment, the casing 20 is clearly divided into the functional component zone Z1 and the filtration zone Z2 and the functional component unit 3 is detachably accommodated in the functional component zone Z1. Therefore, the functional component unit 3 can be easily detached, so that the maintenance and repair of the pump 35 and/or the protein skimmer 6 constituting the unit 3 can be easily performed. Furthermore, the functional component unit 3 includes the pump power cord and various pipes as well as the inlet hose connection 341, the outlet hose connection 342, the protein skimmer connection 343, and the stone replacement operation portion 344, so these components and members could also be easily maintained.

Among other things, the discharge pump 35 can be easily deteriorated or damaged as compared to other components. However, since the pump 35 can be easily maintained, the usability of the filtering device 2 can be dramatically improved.

In addition to the above, in the filtering device 2 of this first embodiment, the wood stone 66 of the protein skimmer 6 can be easily replaced. That is, the upper end portion of the inclined pipe 64 connected to the lower end portion of the skimmer main pipe 61 is opened at the upper surface of the upper wall member 34 of the functional component unit 3, and the wood stone 66 with the air supply pipe 65 is inserted from the upper end opening portion of the inclined pipe 64 and placed at the specified position of the skimmer main pipe 61. Therefore, by pulling out the air supplying pipe 65 from the upper end opening portion of the inclined pipe 64, the wood stone 66 can be detached together with the air supplying pipe 65. In this manner, the wood stone 66 can be easily detached and replaced with new one without removing the skimmer main pipe 61 and/or disassembling the other components. Especially, in the case of the wood stone 66, although the exchanging timing is short due to clogging, the replacement of the wood stone 66 can be made easily. This further improves the usability of the filtering device 2.

Furthermore, in the filtering device 2 of this first embodiment, the casing 20 is provided with the inlet chamber 32 so that the water W from the aquarium 1 can be once stored in the inlet chamber 32 and then supplied from this chamber 32 to the filtration zone Z2. This enables stable supply of water W to the filtration zone Z2, which in turn can improve the filtration capability.

Furthermore, in the filtering device 2 of this first embodiment, the inside of the casing 20 is open to the atmosphere and the upper portion of the casing 20 is in contact with air. Thus, filtering by aerobic filtering bacteria can be performed, which further improves the filtering capability.

Furthermore, in the filtering device 2 of this first embodiment, as the filtration materials 71 to 73, filtering of different types is sequentially performed using wool or activated carbon for physical filtering, the bio ball for aerobic bacterial filtering, and Siporax for anaerobic bacterial filtering. Thus, the water W of the aquarium can be filtered assuredly and kept clean by the dry and wet method, which can keep the aquarium in the optimal environment for aquarium fish and the like.

In addition, in the filtering device 2 of this first embodiment, different types of filtration materials 71 to 73 are stacked to form the filtration zone Z2 to cause the water W to pass through each of the filtration materials 71 to 73 sequentially from the upper one. Therefore, it is possible to assuredly pass the water W through each of the filtration materials 71 to 73 by gravity fall to thereby improve the filtering capability more assuredly.

Also, in the overflow device 5 of the aquarium system of this first embodiment, it is possible to avoid harmful effects to the peripheral environment caused by the suction sound occurring when the water W is sucked from the overflow pipe 54. In a normal overflow pipe 54, water and air are irregularly suctioned when the water W is suctioned from the upper end of the overflow pipe, generating the suction sound of air. In contrast, according to the overflow device 5 of this first embodiment, since the sound insulating cover 57 is mounted in the tank-outside water storage portion 52 so that the sound insulating cover 57 covers all of the four peripheral side surfaces and the upper surface of the above-water area of the periphery of the overflow pipe 54. Therefore, even if the overflow pipe 54 generates suction sound, the suction sound is intercepted by the sound insulating cover 57 and trapped in the cover 57. In this way, the suction sound is intercepted and prevented from spreading outside, so there are no harmful effects of the suction sound to the peripheral environment, and troubles caused by the suction sound can be assuredly prevented.

Second Embodiment

Figure 14:
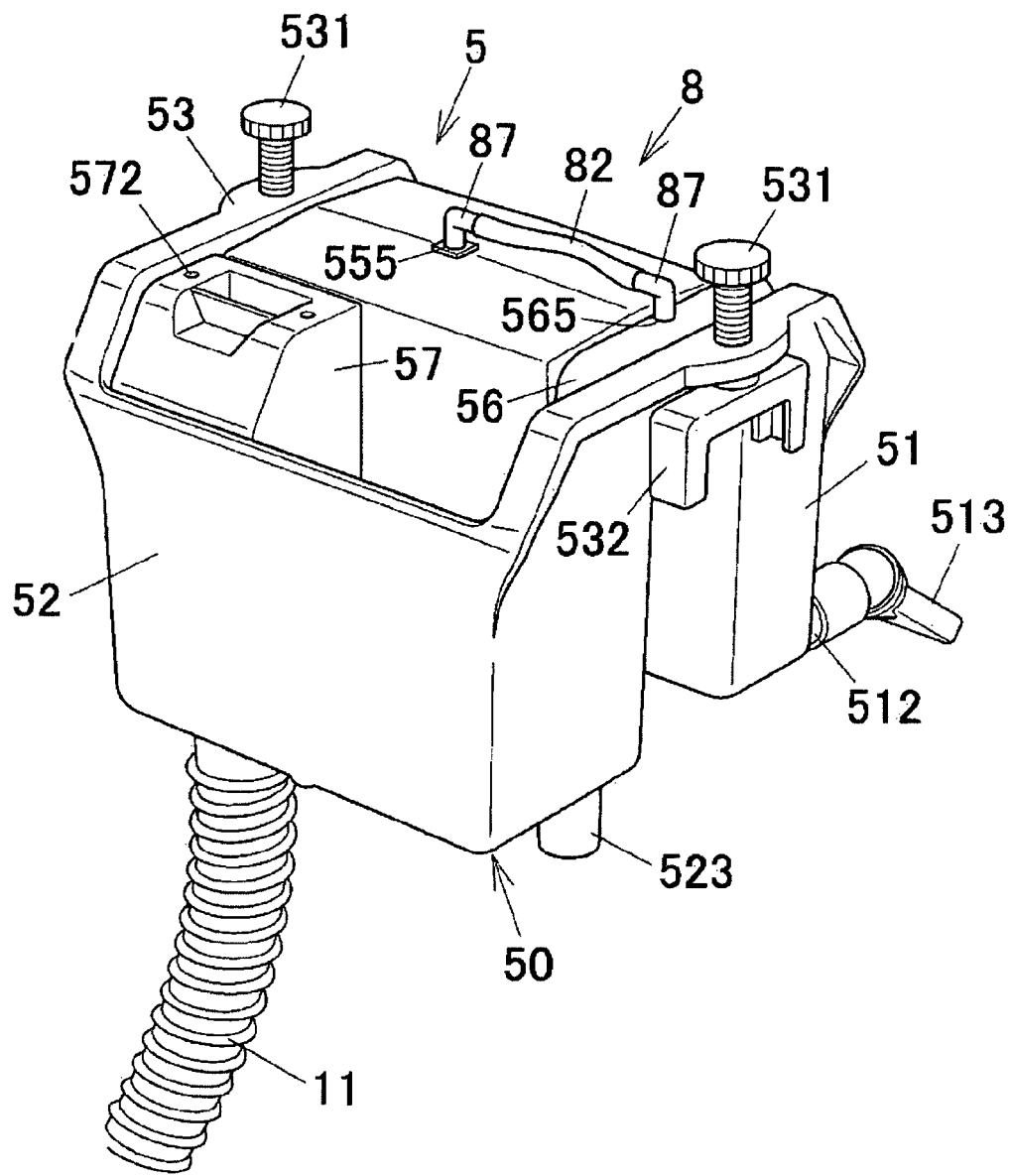
FIG. 14 is a perspective view showing an overflow device applied to the aquarium system of a second embodiment of this invention.
Figure 15:
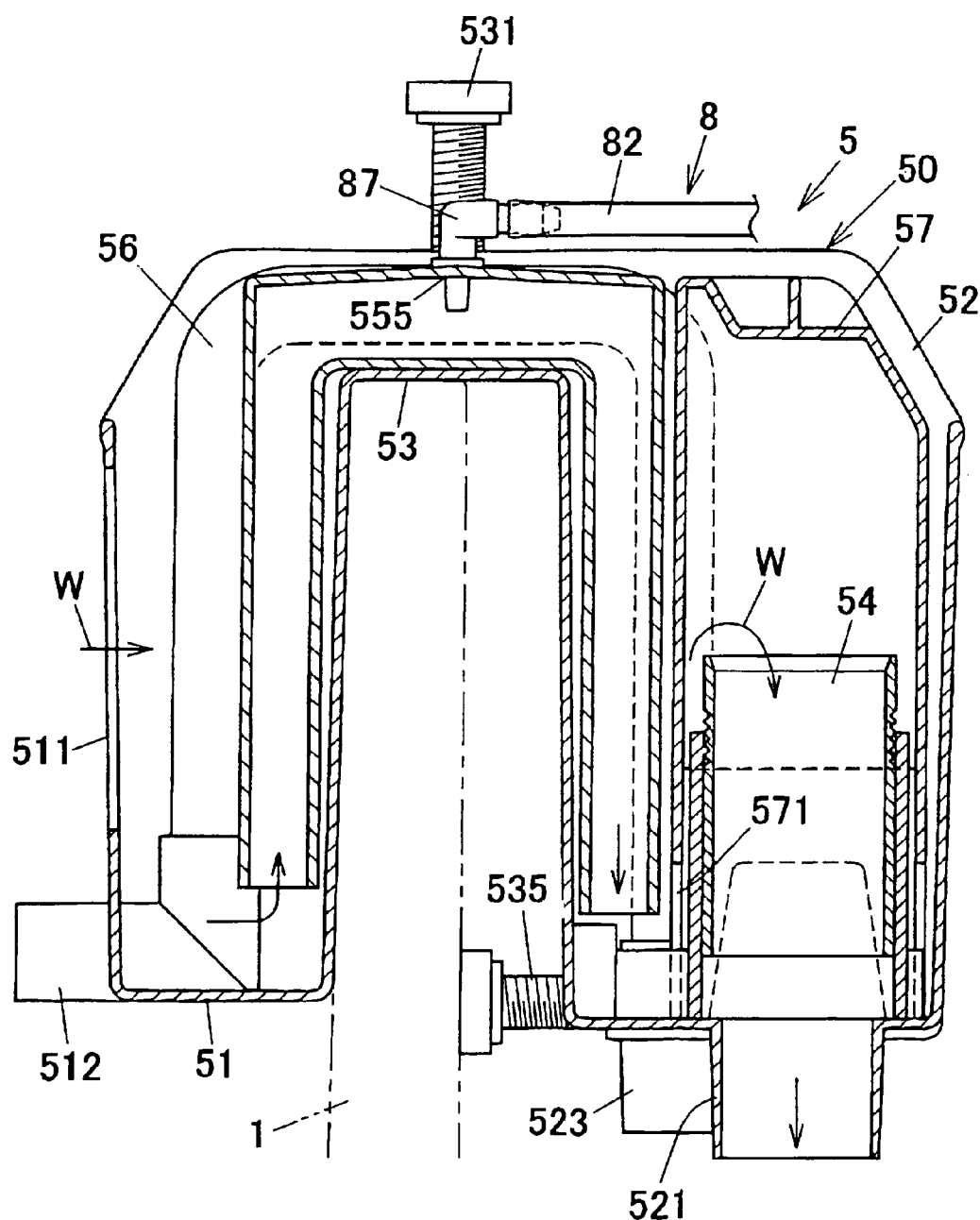
FIG. 15 is a side cross-sectional view of the overflow device of the second embodiment.
Figure 16:
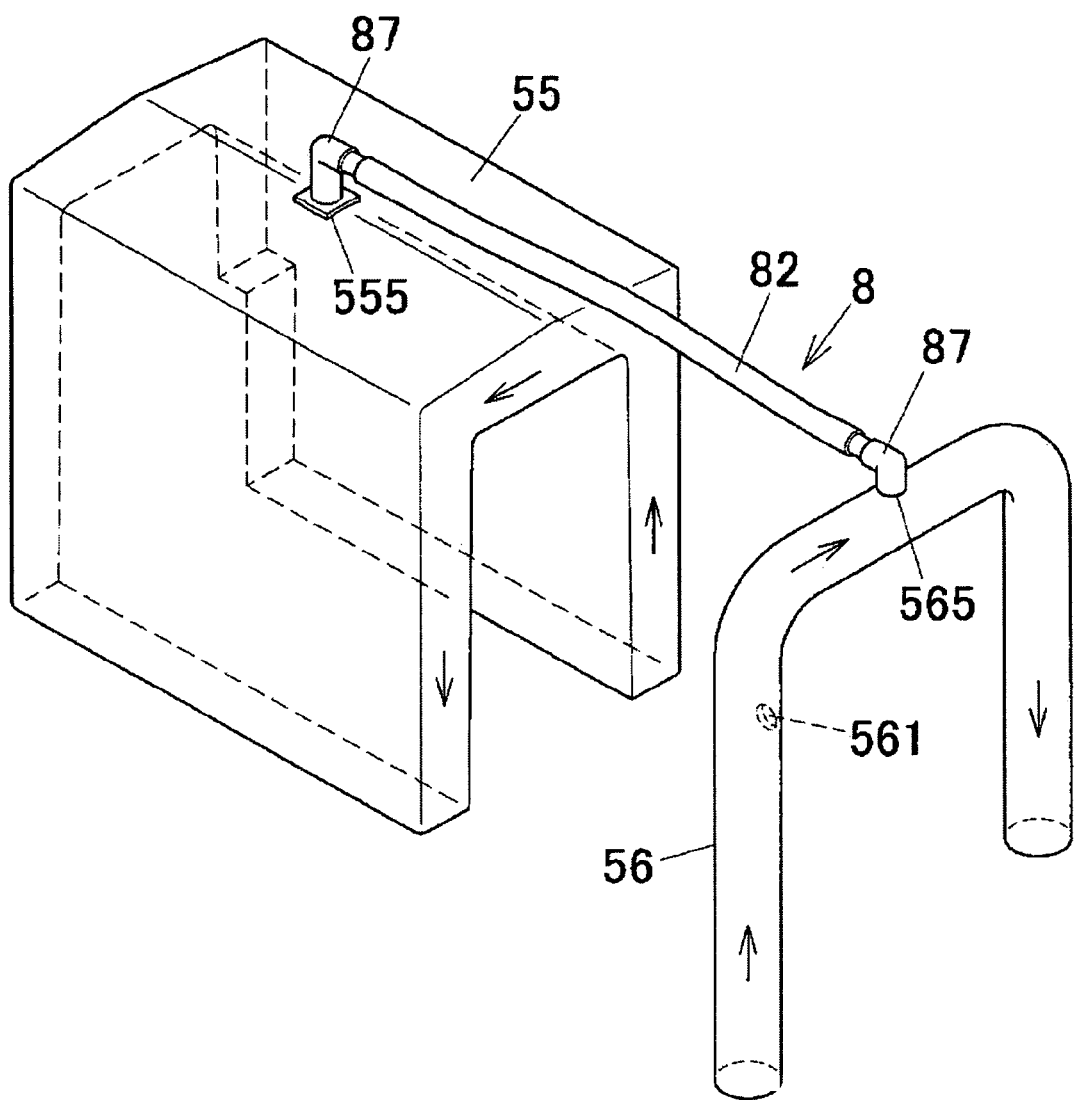
FIG. 16 is a perspective view of the water suction interrupt mechanism and the vicinity thereof of the overflow device of the second embodiment.

FIGS. 14 to 16 show a water suction interception mechanism 8 of an overflow device 5 in an aquarium system according to a second embodiment of this invention. As shown in these drawings, the siphon pipe 55 and the discharge pipe 56 of this overflow device 5 are provided with suction holes 555 and 556 in the same manner as in the aforementioned embodiment. One end of the connection tube 82 is fluidly connected to the siphon side suction hole 555 via the pipe joint 87, and the other end thereof is fluidly connected to the discharge side suction hole 565 via the pipe joint 87.

In this second embodiment, different from the first embodiment, the suction pump 80 and suction tube 81 are not provided.

Furthermore, in the second embodiment, the connection tube 82 and the discharge pipe 56 constitute suction means, and the connection tube constitutes air introduction means.

In this second embodiment, the other structure is essentially the same as that of the first embodiment, and therefore the cumulative explanation will be omitted by allotting the same reference numeral to the same or corresponding portion.

In a normal state of this aquarium system according to the second embodiment, in the same manner as mentioned above, water W is circulating between the aquarium 1 and the filtering device 2. In this normal state, flowing of the water W in the discharge pipe 56 gives a negative pressure in the connection tube 82. Therefore, the suction function causes the water and/or the air (bubbles) in the siphon pipe 55 to be sucked in the discharge pipe 56 via the connection tube 82.

During the normal operation, if the discharge pump 35 stops due to power failure, the water W in the discharge hose 12 flows backward. This causes the water W in the aquarium to be sucked in the discharge pipe 56 to start backward flow of water. However, as explained above, in this embodiment, air will be introduced into the discharge pipe 56 from the backflow preventing hole 561 formed in the discharge pipe 56, which prevents the backward flow of the water W in the aquarium into the filtering device 2.

Further introduction of air into the discharge pipe 56 causes the air to be introduced into the siphon pipe 55 via the backflow preventing hole 561, the discharge pipe 56 and the connection tube 82. The introduced air causes the water W in the siphon pipe 55 to be separated into the water W in the inlet side pipe portion of the siphon pipe 55 and the water W in the outlet side pipe portion thereof. This prevents the water W in the aquarium to be sucked into the siphon pipe 55, resulting in immediate interception of the water supply by the siphon pipe 55.

Also in this second embodiment, even if the discharge pump 35 suddenly stops due to, e.g., power failure, the backward flow of the water W in the aquarium to the outlet hose 12 can be prevented, and at the same time, the supply of the water W by the siphon pipe 55 can be automatically interrupted without delay.

Furthermore, in this second embodiment, even if the water supply by the siphon pipe 55 and the discharge pipe 56 is stopped due to power failure, when the power supply to the discharge pump 35 is resumed by the power recovery, the system returns to its normal state automatically.

In detail, when the discharge pump 35 is driven, the water in the filtering device 2 will be forcibly discharged into the aquarium via the outlet hole 12 and discharge pipe 56. When the water flow is generated in the outlet hose 12, a negative pressure will be given to the connection tube 82 from the side of the discharge pipe 56. Accordingly, by this suction function, the air in the siphon pipe 55 will be sucked and discharged via the connection tube 82. Thus, the air in the siphon pipe 55 is discharged, causing the water W in the aquarium to be sucked by the siphon pipe 55 and supplied to the filtering device 2.

Furthermore, in the overflow device 5 of this second embodiment, without requiring a suction pump, in the same manner as in the first embodiment, unexpected sucking of water by the siphon pipe 55 and the discharge pipe 56 can be intercepted, and the system can be automatically recovered after power recovery. The elimination of a suction pump decreases the number of components, resulting in simplified structure and reduced cost.

In this second embodiment, except for the functions and effects mentioned above, the same functions and effects as in the first embodiment can be obtained.

Third Embodiment

Figure 17:
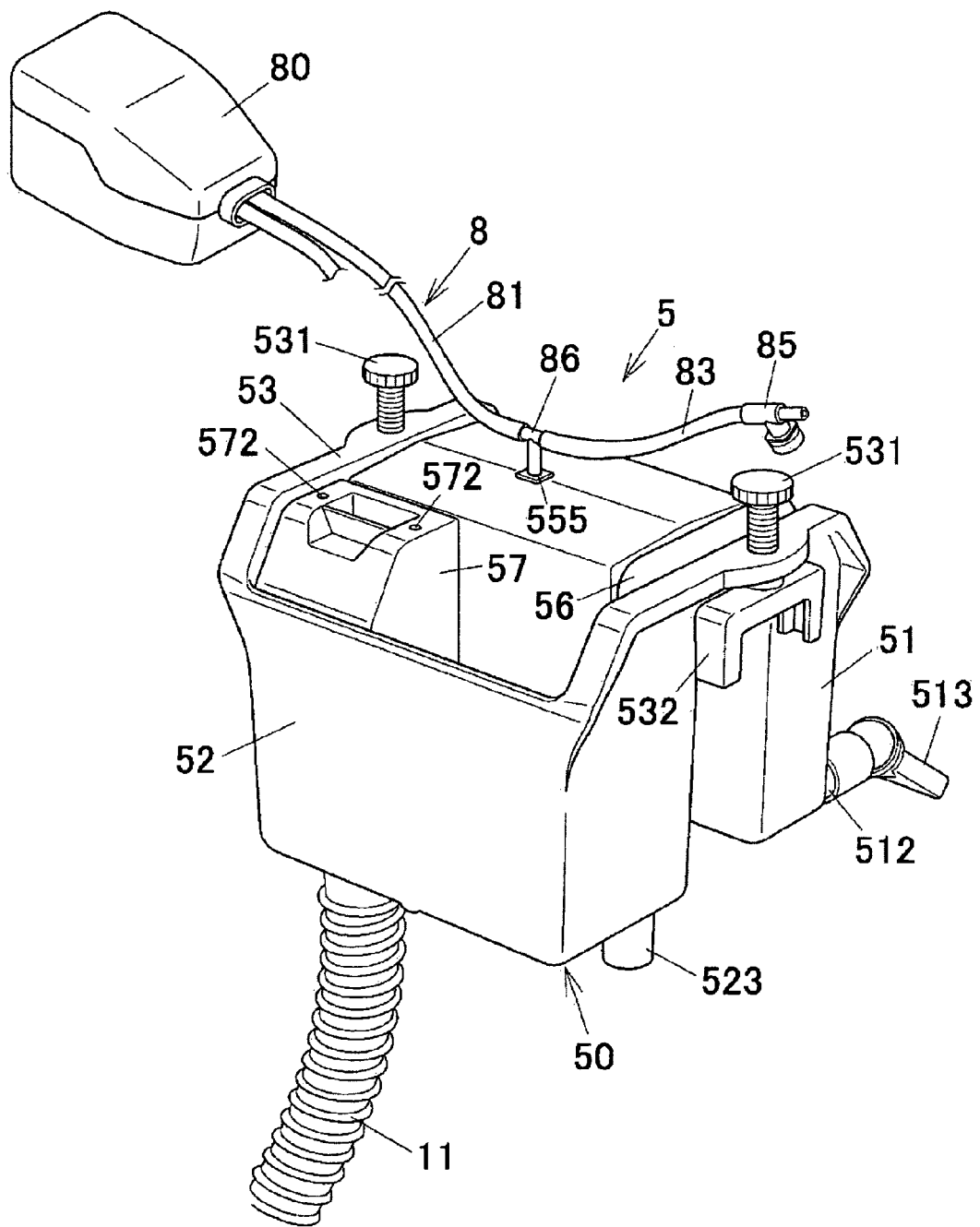
FIG. 17 is a perspective view showing an overflow device applied to the aquarium system of a third embodiment of this invention.
Figure 18:
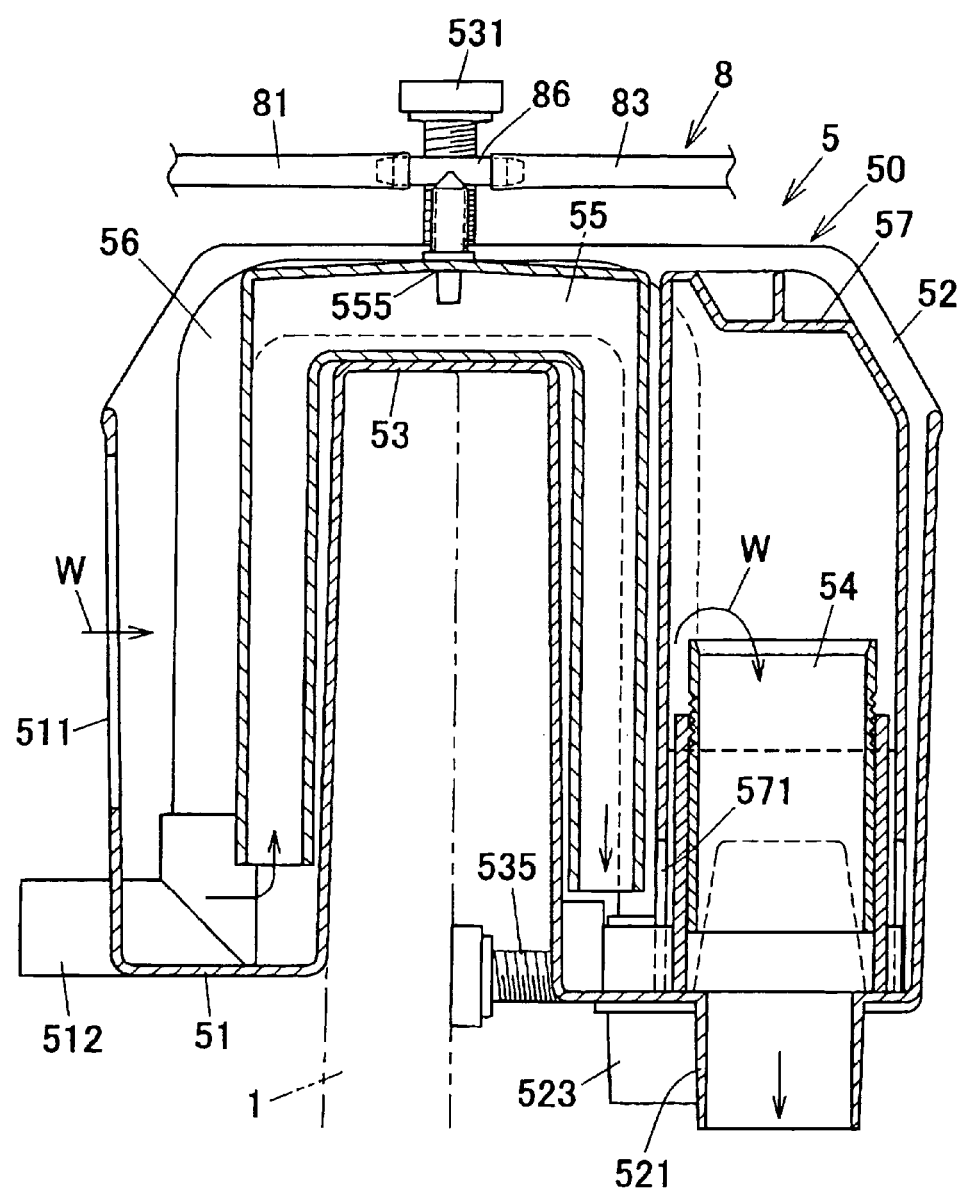
FIG. 18 is a side cross-sectional view of the overflow device of the third embodiment.
Figure 19:
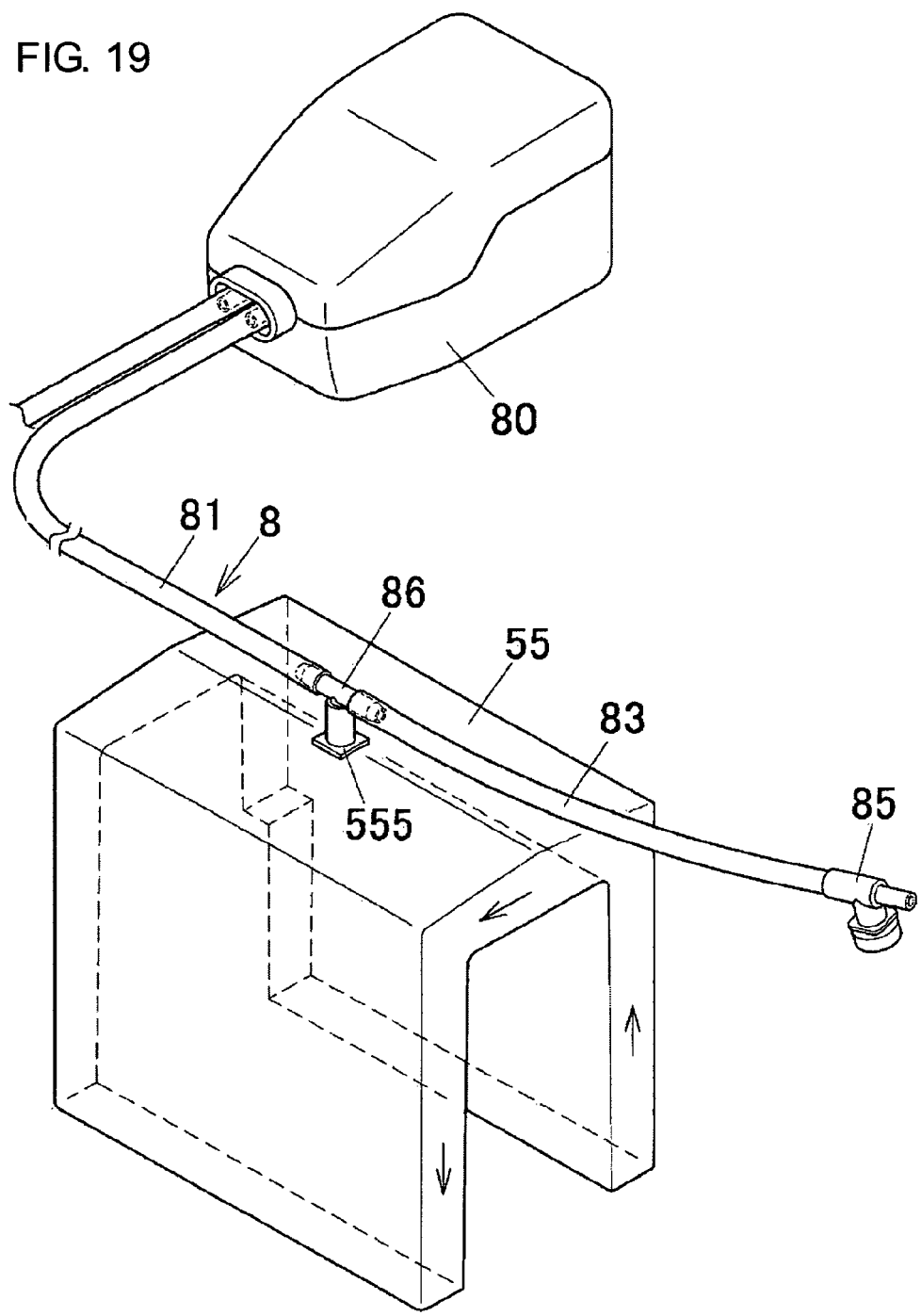
FIG. 19 is a perspective view of the water suction interrupt mechanism and its vicinity of the overflow device of the third embodiment.

FIGS. 17 to 19 show a water suction interception mechanism 8 of an overflow device 5 in an aquarium system according to a third embodiment of this invention. As shown in these drawings, the siphon pipe 55 of this overflow device 5 is provided with a suction hole 555 in the same manner as mentioned above. To this suction hole 555, in the same manner as in the first embodiment, a first connecting portion of the T-shaped pipe joint 86 is fluidly connected. Furthermore, connected to a second connecting portion of the pipe join 86 is one end of the suction tube 81 with the other end thereof connected to a suction pump 80.

To a third connecting portion of the pipe joint 86, one end of an air introduction tube 83 is fluidly connected. To the other end of this tube 83, a control valve 85 is attached.

This control valve 85 is comprised of an electromagnetic valve which is configured to maintain its closed state when the power is turned on and turn to an open state when the power is turned off.

In the third embodiment, different from the aforementioned embodiments, no suction hole is formed in the discharge pipe 56. The suction pipe 56 and the siphon pipe 55 are not communicated via the suction hole.

Furthermore, in the third embodiment, the suction pump 80 and the suction tube 81 constitute a suction means, and the air introduction tube 83 and the control valve 85 constitute an air introduction means.

In this third embodiment, the other structure is essentially the same as that of the aforementioned embodiments, and therefore the cumulative explanation will be omitted by allotting the same reference numeral to the same or corresponding portion.

In a normal state in the aquarium system of this third embodiment, in the same manner as mentioned above, water W is circulating between the aquarium 1 and the filtering device 2. In its normal state, the driving of the suction pump 80 causes the water and/or air (bubbles) in the siphon pipe 55 to be sucked and discharged toward the suction pump 80 via the suction tube 81.

In cases where the discharge pump 35 and the suction pump 80 stop due to power failure during the normal operation, the suction by the suction pipe 80 to the siphon pipe 55 is stopped and the control valve 85 is opened, causing outside air (air) to be introduced into the siphon pipe 55 via the control valve 85 and the air introduction tube 83. The introduced air causes the water W in the siphon pipe 55 to be separated into the water W in the inlet side pipe portion of the siphon pipe 55 and the water W in the outlet side pipe portion thereof. This prevents the water W in the aquarium to be sucked into the siphon pipe 55, resulting in immediate interception of the water supply by the siphon pipe 55.

Also in this third embodiment, in the same manner as mentioned above, in cases where the discharge pump 35 stops, air will be introduced into the discharge pipe 56 from the backflow preventing hole 561 to prevent backward flow of the water W in the aquarium.

Also in this third embodiment, even if the discharge pump 35 suddenly stops due to, e.g., power failure, the backward flow of the water W in the aquarium to the outlet hose 12 can be prevented, and at the same time, the supply of the water W by the siphon pipe 55 can be automatically interrupted without delay.

Furthermore, also in this third embodiment, even if the water supply by the siphon pipe 55 and the discharge pipe 56 is stopped due to power failure, when the power supply to the discharge pump 35, the suction pump 80 and the control valve 85 is resumed by the power recovery, the system returns to its normal state automatically.

In detail, when the discharge pump 35 is driven, the water in the filtering device 2 will be forcibly discharged into the aquarium via the outlet hole 12 and discharge pipe 56. On the other hand, by driving the suction pump 80, the air in the siphon pipe 55 will be sucked and discharged via the suction tube 81. Thus, the air in the siphon pipe 55 is discharged, causing the water W in the aquarium to be sucked by the siphon pipe 55 and supplied to the filtering device 2.

In this third embodiment, except for the functions and effects mentioned above, the same functions and effects as in the aforementioned embodiments can be obtained.

<Modification>

In the aforementioned embodiments, although the explanation was directed to the case in which the functional component unit 3 of the aquarium filtering device 2 includes the discharge pump 35 and the protein skimmer 6, the present invention is not limited to it. In the present invention, it is not required that the functional component unit 3 includes the protein skimmer. Furthermore, the functional component unit 3 can include a heater, an air blower, a cooler or the like, for adjusting the water temperature.

In the overflow device 5 of the abovementioned embodiments, the tank-inside water storage portion 51 is provided in the aquarium 1 so that the water W in the aquarium is supplied to the tank-outside water storage portion 52 via the siphon pipe 55, but the present invention is not limited to that. In the present invention, it is not always required to provide the tank-inside water storage portion. The inlet side end portion of the siphon pipe can be placed directly in the aquarium.

Also, in the abovementioned embodiments, although the explanation was directed to the case in which the present invention is applied to the overflow device in which the overflow pipe 54 is provided in the tank-outside water storage portion 52, the present invention is not limited to it. The present invention can also be applied to an overflow device in which water W discharged from a filtration device is once stored in a water storage portion provided in the aquarium and then the water W is supplied from the water storage portion to the aquarium via an overflow pipe.

This application claims priority to Japanese Patent Application No. 2006-228892 filed on Aug. 25, 2006, the entire disclosure of which is incorporated herein by reference in its entirety.

It should be understood that the terms and expressions used herein are used for explanation and have no intention to be used to construe in a limited manner, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The aquarium overflow device according to the present invention can be used for an aquarium equipment for supplying water in an aquarium for aquarium fish, etc., to a filtering device, etc.

The invention claimed is:

1. An aquarium overflow device for supplying water in an aquarium to an external device disposed outside the aquarium, the overflow device comprising:
   an inverted U-shaped siphon pipe for supplying the water in the aquarium to an outside of the aquarium, the siphon pipe having an inlet side end portion to be disposed in the aquarium and an outlet side end portion to be disposed outside the aquarium;
   a suction device connected to an upper portion of the siphon pipe and configured to suck an inside of the siphon pipe;
   an air introducing device for introducing air into the upper portion in the siphon pipe when suction by the suction device is stopped; and
   an inverted U-shaped discharge pipe having an inlet side end portion to be disposed outside of the aquarium and an outlet side end portion to be disposed inside of the aquarium;
   wherein the aquarium overflow device is configured such that water fed from the external device is introduced by a water supply device into the discharge pipe from the inlet side end portion and then discharged into the aquarium from the outlet side end portion;
   wherein a backward flow preventing opening is provided at an upper portion of the discharge pipe; and
   wherein the aquarium overflow device is configured such that when water supply from the external device by the water supply device is stopped, air is introduced into the discharge pipe from the backward flow preventing opening to prevent backward flow of the water.

2. The aquarium overflow device as recited in claim 1, wherein the suction device includes a suction tube having one end connected to the upper portion of the siphon pipe, a suction pump connected to another end of the suction tube, and a connection tube having one end connected to the upper portion of the siphon pipe and another end connected to an upper portion of the discharge pipe;
   wherein the connection tube doubles as the air introducing device; and
   wherein, when the suction pump and the water supply device are being driven, an inside of the siphon pipe is sucked by a suction function caused by a water flow in the discharge pipe via the connection tube and also an inside of the siphon pipe is sucked by the suction pump via the connection tube, on the other hand, when the suction pump and the water supply device are stopped, the air introduced into the discharge pipe from the backward flow preventing opening is introduced into the siphon pipe via the connection tube.

3. The aquarium overflow device as recited in claim 1, wherein the air introducing device comprises a connection tube having one end connected to the upper portion of the siphon pipe and another end connected to an upper portion of the discharge pipe; and
   wherein, when the suction pump and the water supply device are being driven, an inside of the siphon pipe is sucked by a suction function caused by a water flow in the discharge pipe via the connection tube, on the other hand, when the suction pump and the water supply device are stopped, the air introduced into the discharge pipe from the backward flow preventing opening is introduced into the siphon pipe via the connection tube.

4. The aquarium overflow device as recited in claim 1, wherein the suction device includes a suction tube having one end connected to the upper portion of the siphon pipe and a suction pump connected to another end of the suction tube;
   wherein the air introducing device includes an air introducing tube having one end connected to the upper portion of the siphon pipe and a control valve connected to another end of the air introducing tube and configured to open and close in response to the suction pump; and
   wherein when the suction pump is being driven, the control valve is maintained in a closed state and an inside of the siphon pipe is sucked by the suction pump via the suction tube, on the other hand, when the suction pump is stopped, the control valve is kept open so that air is introduced into the siphon pipe via the air introducing tube.

* * * * *